(12) United States Patent
Morita et al.

(10) Patent No.: US 10,570,858 B2
(45) Date of Patent: Feb. 25, 2020

(54) CANISTER DISPOSING STRUCTURE OF SADDLE RIDING VEHICLE

(71) Applicant: HONDA MOTOR CO., LTD., Minato-Ku, Tokyo (JP)

(72) Inventors: Jiro Morita, Wako (JP); Nobuyuki Kishi, Wako (JP); Ko Kurata, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 75 days.

(21) Appl. No.: 15/837,547

(22) Filed: Dec. 11, 2017

(65) Prior Publication Data
US 2018/0179992 A1 Jun. 28, 2018

(30) Foreign Application Priority Data

Dec. 27, 2016 (JP) ................................. 2016-253526

(51) Int. Cl.
| | |
|---|---|
| B62K 11/00 | (2006.01) |
| F02M 25/08 | (2006.01) |
| F02B 61/02 | (2006.01) |
| B62J 35/00 | (2006.01) |
| F02M 37/00 | (2006.01) |
| B62J 37/00 | (2006.01) |

(52) U.S. Cl.
CPC ............ *F02M 25/089* (2013.01); *B62J 35/00* (2013.01); *B62J 37/00* (2013.01); *F02B 61/02* (2013.01); *F02M 37/007* (2013.01); *F02M 25/0854* (2013.01); *F02M 2025/0863* (2013.01)

(58) Field of Classification Search
CPC ............ B62J 35/00; B62J 37/00; F02B 61/02; F02M 37/007; F02M 2025/0863; F02M 25/089; F02M 25/0854
USPC .................. 123/516–523, 509, 195 A, 195 C
See application file for complete search history.

(56) References Cited

U.S. PATENT DOCUMENTS

| | | | | |
|---|---|---|---|---|
| 2010/0163328 A1* | 7/2010 | Hasegawa | ................ | B62J 35/00 180/225 |
| 2010/0206653 A1* | 8/2010 | Koike | ...................... | B62J 35/00 180/225 |

(Continued)

FOREIGN PATENT DOCUMENTS

| | | |
|---|---|---|
| JP | 2013-071583 A | 4/2013 |
| JP | 2015-110381 A | 6/2015 |
| JP | 2015-174600 A | 10/2015 |

OTHER PUBLICATIONS

Office Action issued in the corresponding Japanese Patent Application 2016-253526 dated Nov. 19, 2019 with the English translation thereof.

*Primary Examiner* — Hai H Huynh
*Assistant Examiner* — Gonzalo Laguarda
(74) *Attorney, Agent, or Firm* — Carrier Blackman & Associates, P.C.; William D. Blackman; Joseph P. Carrier

(57) ABSTRACT

A canister includes a fresh air introducing port for introducing a fresh air into the canister. The fresh air introducing port is opened in a space formed by at least a tank cover. The canister is connected to a drain pipe for draining a liquid in the canister to the outside of the canister. The drain pipe extends rearward at a height same as or higher than a lower end of the tank cover. The drain pipe merges with a supplied-fuel drain pipe and extends to a lower portion of a vehicle. The supplied-fuel drain pipe drains a fuel around a fuel supply port of a fuel tank.

23 Claims, 16 Drawing Sheets

(56) References Cited

U.S. PATENT DOCUMENTS

2010/0243354 A1\* 9/2010 Inaoka ............... F02M 25/0854
                                                    180/69.4
2015/0158540 A1\* 6/2015 Hara ..................... B62K 11/10
                                                    180/219

\* cited by examiner

CANISTER DISPOSING STRUCTURE OF SADDLE RIDING VEHICLE

CROSS-REFERENCE TO RELATED APPLICATIONS

The present application claims priority under 35 U.S.C. § 119 to Japanese Patent Application No. 2016-253526 filed on Dec. 27, 2016. The content of the application is incorporated herein by reference in its entirety.

TECHNICAL FIELD

The present invention relates to a canister disposing structure of a saddle riding vehicle.

BACKGROUND ART

Conventionally, a canister disposing structure is known (for example, refer to Patent Literature 1), in which a canister is disposed below a front portion of a fuel tank. In such a position, the canister is covered with a tank shroud, in side view. In such a position, the canister is supported to the tank shroud. Further, a fresh air introducing pipe is connected to a lower end portion of the canister, and a charge pipe is connected to an upper end portion of the canister. The fresh air introducing pipe and a drain pipe extend below the tank shroud. The charge pipe extends from a tank bottom plate (a position facing a main frame) into the fuel tank.

Further, another canister disposing structure is known (for example, refer to Patent Literature 2), in which a canister is supported to a tank outer plate, and a fresh air introducing pipe and a drain pipe extend below a tank cover.

CITATION LIST

Patent Literature

[Patent Literature 1] JP-A No. 2013-71583
[Patent Literature 2] JP-A No. 2015-174600

SUMMARY OF INVENTION

Technical Problem

In Patent Literature 1 and Patent Literature 2, for keeping performance of the canister, it is preferable to open the fresh air introducing pipe in a place having an extremely small amount of water or dust.

It is an object of the present invention to provide a canister disposing structure of a saddle riding vehicle, which structure can keep performance of the canister for a long time, is simple and features an excellent design.

Solution to Problem

According to an aspect of this invention, a canister disposing structure of a saddle riding vehicle, includes: an engine installed to a vehicle body frame in a rear side of a front wheel; a fuel tank supported to the vehicle body frame in an upside of the engine; a tank cover for covering the fuel tank from a lateral side, the tank cover extending frontward of at least the fuel tank; and a canister covered with the tank cover from a lateral side in a position where the canister overlaps with the fuel tank in height, as seen in a side view. In the canister disposing structure of a saddle riding vehicle, the canister includes a fresh air introducing port for introducing a fresh air into the canister, the fresh air introducing port being opened in a space formed by at least the tank cover, and the canister is connected to a drain pipe for draining a liquid in the canister to the outside of the canister, the drain pipe extending rearward at a height same as or higher than a lower end of the tank cover, the drain pipe merging with a supplied-fuel drain pipe and extending to a lower portion of a vehicle, the supplied-fuel drain pipe draining a fuel around a fuel supply port of the fuel tank.

In the above invention, the canister may be connected to a charge pipe for leading an evaporative fuel generated in the fuel tank to the canister, and the charge pipe may extend in the fuel tank in a position where an outer plate of the fuel tank is covered with the tank cover from a lateral side.

Further, according to the above invention, the tank cover may include: a cover body forming a side face of the vehicle body; and an inner cover for covering an inside of the cover body in a vehicle width direction, and at least a connecting portion for connecting the cover body with the inner cover may be made into a dust-proof structure.

Further, according to the above invention, the canister may be positioned in the tank cover, and a weight of the canister may be supported with the fuel tank.

Further, according to the above invention, an entirety of the canister may be in a cylindrical form. In side view, an inclination angle of the canister relative to a vertical line may be set between the following angles: an inclination angle of the head pipe of the vehicle body frame relative to the vertical line; and an inclination angle 0° relative to the vertical line. A lower end of the canister may be supported to the fuel tank.

Further, according to the above invention, a stay may be fixed to an outer plate of the fuel tank, and the weight of the canister may be supported with the stay.

Further, according to the above invention, the fuel tank may include a bottom plate fixed to the outer plate, a peripheral edge of the outer plate and a peripheral edge of the bottom plate are fixed to form a flange, the flange may extend toward a bottom face of the canister, and the flange may support the weight of the canister.

Further, according to the above invention, the canister may be supported to the tank cover, and the tank cover may be supported to the vehicle body frame.

Advantageous Effects of Invention

According to the canister disposing structure of a saddle riding vehicle of the aspect of the present invention, the canister has the fresh air introducing port for introducing a fresh air into the canister. The fresh air introducing port is opened in the space formed by at least the tank cover. Accordingly, the space formed by at least the tank cover can be disposed frontward and upward of the engine. Accordingly, this structure prevents entry of any dust or water splash, and scarcely has a possibility of swamp. Thus, even a simple structure free from a fresh air introducing pipe connected to the fresh air introducing port can prevent entry of any dust or water into the canister and can keep performance of the canister for a long time.

Further, the drain pipe is connected to the canister. The drain pipe drains a liquid in the canister to the outside of the canister. The drain pipe extends rearward at the height same as or higher than the lower end of the tank cover. The supplied-fuel drain pipe drains the fuel around the fuel supply port of the fuel tank. Then, the drain pipe merges with the supplied-fuel drain pipe. Then, the drain pipe extends to the lower portion of the vehicle body. Thus, being free from the conventional pipe extending downward from the tank cover, this structure prevents the drain pipe from being exposed to an outside. Accordingly, this structure improves design. Further, this structure can simplify the piping operation associated with the fuel tank.

Further, according to the above invention, the charge pipe is connected to the canister. The charge pipe leads the evaporative fuel generated in the fuel tank to the canister. In the position where the outer plate of the fuel tank is covered with the tank cover from the lateral side, the charge pipe extends into of the fuel tank. Accordingly, this structure can shorten the entire length of the charge pipe, thus making it possible to facilitate the assembling work and suppress cost.

Further, according to the above invention, the tank cover includes the cover body and the inner cover. The cover body constitutes the side face of the vehicle body. The inner cover covers an inside of the cover body in the vehicle width direction. At least the portion for connecting the cover body with the inner cover serves as a dust-proof structure. Thus, this structure can suppress entry of any dust or water splash into the space formed by at least the cover body and inner cover.

Further, according to the above invention, the canister is positioned in the tank cover, and the weight of the canister is supported with the fuel tank. Due to this, with a high positioning accuracy, this structure can support the canister to any of the fuel tank and the tank cover. Further, this structure can be free from any wasteful clearance. Thus, this structure makes it possible to accomplish miniaturizing of the space and the circumference of the space, leading to a compactness. Further, the load applied to the resinous tank cover is reduced, thus improving durability.

Further, according to the above invention, the entirety of the canister is in a form of a cylinder. In side view, the inclination angle of the canister relative to the vertical line is set between the inclination angle of the head pipe of the vehicle body frame relative to the vertical line and the inclination angle 0° relative to the vertical line. The lower end of the canister is supported to the fuel tank. Due to this, while suppressing an interference attributable to a handlebar manipulation with the front fork, this structure can lessen bulging of the tank cover. Further, this structure can stably support the weight of the canister.

Further, according to the above invention, the stay is fixed to the outer plate of the fuel tank and the weight of the canister is supported with the stay. With this structure, using the stay can increase degree of freedom of disposing the canister, thus making it possible to support the canister in the most suitable position in the space.

Further, according to the above invention, the fuel tank includes the bottom plate fixed to the outer plate. The peripheral edges of the respective outer plate and bottom plate are fixed, to thereby form the flange. The flange extends toward the bottom face of the canister. The flange supports the weight of the canister. Thus, this structure can reduce the number of parts.

Further, according to the above invention, the canister is supported with the tank cover. The tank cover is supported with the vehicle body frame. Thus, this structure improves durability of the tank cover which supports the canister.

DESCRIPTION OF EMBODIMENTS

Hereinafter, referring to drawings, each embodiment of the present invention is to be explained about. Further, in the explanation, unless specified, descriptions of directions such as front and rear, right and left, and up and down are the same as those of the directions relative to the vehicle body. Further, in each drawing, the symbol FR denotes a frontward direction of the vehicle body, the symbol UP denotes an upward direction of the vehicle body, and the symbol LH denotes a leftward direction of the vehicle body.

First Embodiment

Figure 1:
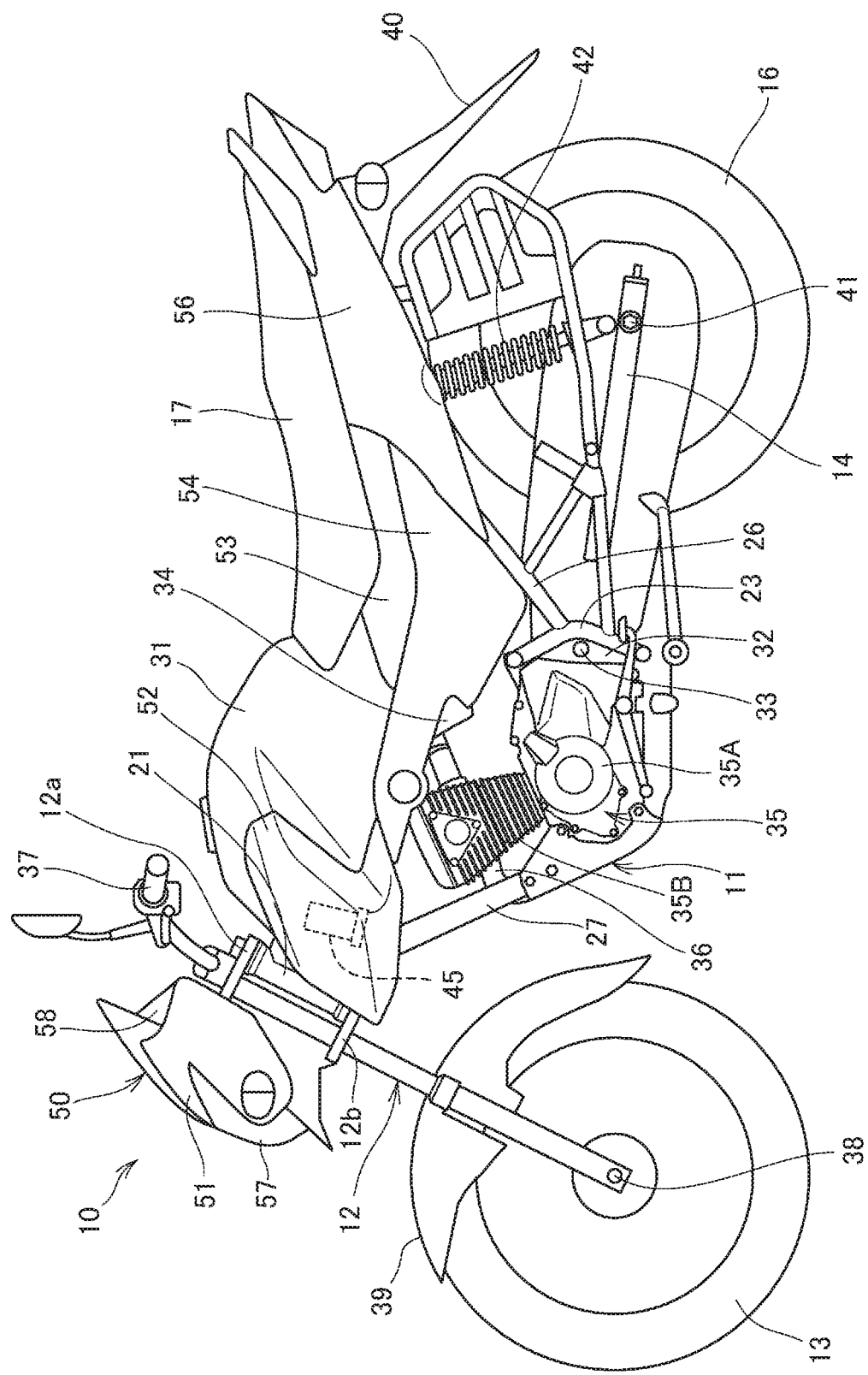
FIG. 1 is a left side view of a motorcycle including a canister disposing structure, according to a first embodiment of the present invention.

FIG. 1 is a left side view of a motorcycle 10 including a canister disposing structure, according to a first embodiment of the present invention. In each of FIG. 1 and drawings after FIG. 1, an explanation will be made about the canister 45 disposing structure including each piping to be connected.

The motorcycle 10 has a front wheel 13, a rear wheel 16 and a seat 17. The front wheel 13 is supported to the front end portion of a vehicle body frame 11 via a front fork 12. The rear wheel 16 is supported to the lower portion of the vehicle body frame 11 via a swing arm 14. The seat 17 is supported to the upper portion of the vehicle body frame 11.

The vehicle body frame 11 has a head pipe 21, one main frame 22, a pair of right and left center frames 23, a pair of right and left seat rails 24 (refer to FIG. 2), a pair of right and left sub-frames 26 and a down frame 27. The main frame 22 extends obliquely rearward and downward from the head pipe 21.

The head pipe 21 is provided in the front end portion of the vehicle body frame 11. The main frame 22 extends rearward from the head pipe 21, supporting a fuel tank 31. The center frame 23 extends downward from the rear end of the main frame 22. A pivot plate 32 is mounted to the lower portion of the center frame 23. A pivot shaft 33 extending in the vehicle width direction is mounted to the pivot plate 32. The seat rail 24 extends rearward from the rear portion of the main frame 22, supporting the seat 17. The sub-frame 26 is mounted across the center frame 23 and the seat rail 24. In a position lower than the main frame 22, the front end of the down frame 27 is mounted to the head pipe 21. The down frame 27 extends downward and obliquely rearward from the head pipe 21. Together with the center frame 23, the down frame 27 supports an engine 35.

The front fork 12 has a top bridge 12a and a bottom bridge 12b which connect the right with the left. A steering stem runs across the upper and the lower between the top bridge 12a and the bottom bridge 12b. The steering stem is rotatably supported to the head pipe 21. This allows the front fork 12 to be steerably supported to the head pipe 21.

A handlebar 37 is mounted to an upper face of the top bridge 12a. Via an axle shaft 38, the front wheel 13 is supported to the lower end portion of the front fork 12. The front wheel 13 is covered with a front fender 39 from the upside.

The front end portion of the swing arm 14 is supported to the pivot shaft 33 in a manner to swing upward and downward. Via an axle shaft 41, the rear wheel 16 is supported to the rear end portion of the swing arm 14. The rear wheel 16 is covered with a rear fender 40 from the upside. A rear cushion unit 42 runs across the rear end portion of the swing arm 14 and the vehicle body frame 11 above the rear end portion of the swing arm 14. The rear cushion unit 42 has a buffering function.

A canister 45 is disposed on a lateral side of a fuel tank 31. With an activated carbon, the canister 45 once adsorbs an evaporative fuel in the fuel tank 31. At the time of operation of the engine 35, the canister 45 takes in a fresh air, to thereby discharge the evaporative fuel from the activated carbon. Then, the canister 45 supplies the evaporative fuel to an air intake device 34 of the engine 35.

The canister 45 is disposed in a portion higher than either the upper end of the front wheel 13 or the upper end of the rear wheel 16 whichever is lower.

The engine 35 includes a crankcase 35A and a cylinder portion 35B. While being inclined frontward from the front portion of the crankcase 35A, the cylinder portion 35B extends upward. The air intake device 34 is connected to the rear portion of the cylinder portion 35B. The air intake device 34 includes a throttle body and an air cleaner. An exhaust device 36 is connected to the front portion of the cylinder portion 35B.

The upper portion of the vehicle body frame 11 is covered with a vehicle body cover 50. The vehicle body cover 50 has a front cowl 51, a pair of right and left tank covers 52, a pair of right and left side upper covers 53, a pair of right and left side lower covers 54, and a pair of rear covers 56.

The front cowl 51 covers the head pipe 21 and the upper portion of the front fork 12 from a front side. A head light 57 and a meter 58 are disposed in the front cowl 51. The pair of right and left tank covers 52 are disposed and cover the right and left in the front portion of the fuel tank 31 from the lateral side. The canister 45 is disposed inside (center side of vehicle body) in the vehicle width direction of the tank cover 52 on one side (left side). Both of the fuel tank 31 and the tank cover 52 support the canister 45. The side upper cover 53 covers the lower side of the seat 17 and the rear side of the fuel tank 31. The side lower cover 54 covers the lower side of each of the fuel tank 31 and the side upper cover 53.

The rear cover 56 covers the lower side of the seat 17 and the rear side of each of the side upper cover 53 and the side lower cover 54.

Figure 2:
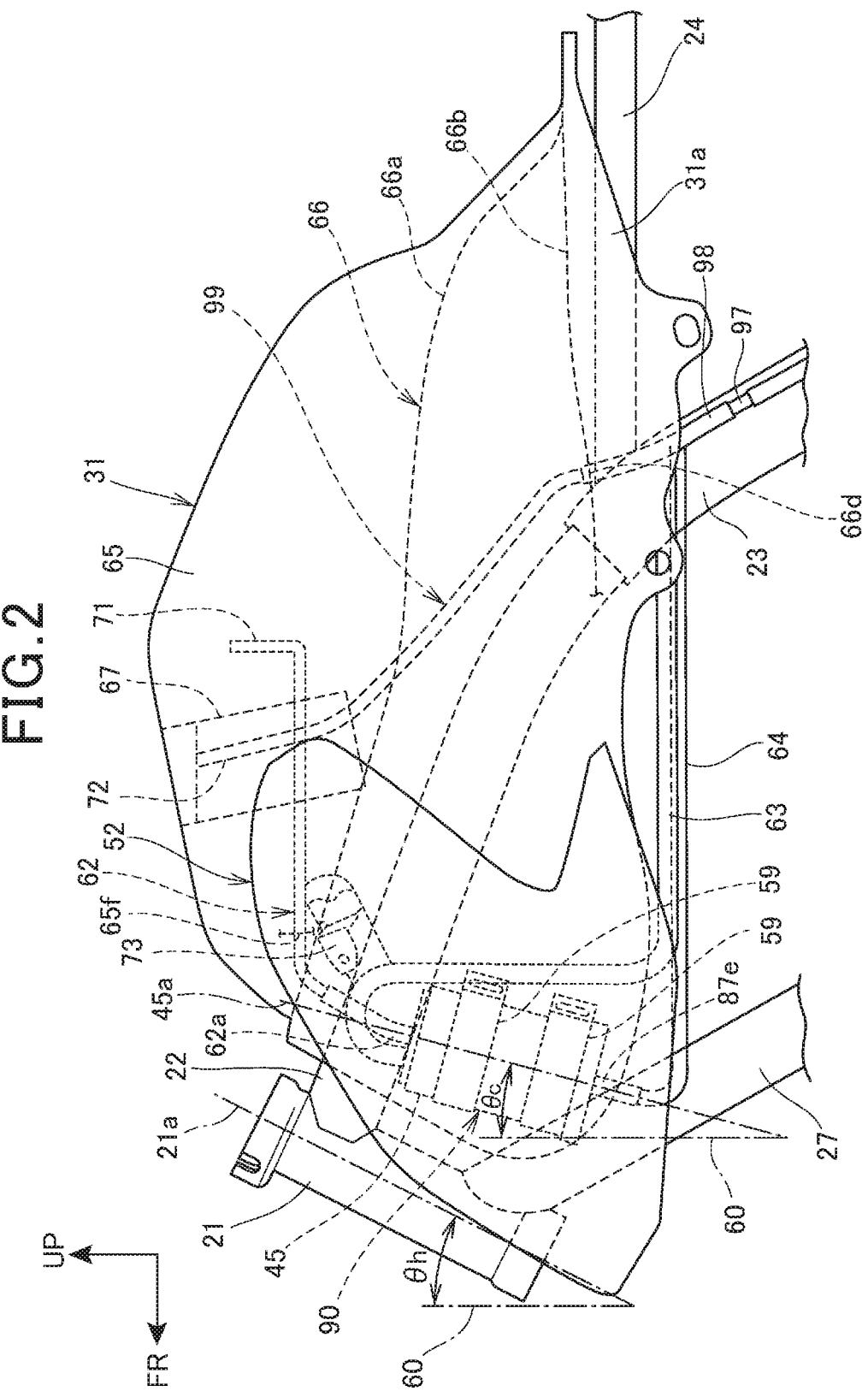
FIG. 2 is a left side view showing the canister disposing structure.

FIG. 2 is a left side view showing the canister 45 disposing structure.

The canister 45 is formed in a cylindrical shape. The activated carbon is loaded into the canister 45. In side view of the vehicle, the canister 45 is disposed on one side (specifically, left side) in the front portion of the fuel tank 31. The canister 45 is covered with the tank cover 52 from the lateral side. Further, in side view, the canister 45 is disposed in a position more rearward than the front end of the fuel tank 31 and more upward than the lower end of the fuel tank 31. Further, in side view, the canister 45 is disposed between the main frame 22 and the down frame 27.

The tank cover 52 extends to the position more frontward, in the vehicle, than the fuel tank 31 and to the lateral side of the head pipe 21.

An axis line 45a of the canister 45 is inclined in a manner that, in side view, an upside of the axis line 45a is positioned more rearward, in the vehicle, than a lower side of the axis line 45a. An inclination angle θc of the axis line 45a relative to a vertical line 60 is an angle between an inclination angle θh of an axis line 21a of the head pipe 21 relative to the vertical line 60 and an inclination angle 0° relative to the vertical line 60. That is, the axis line 45a has an inclination angle which is equivalent to or less than that of the axis line 21a.

To the upper end of the canister 45, a charge pipe 62 and a purge pipe 63 are connected. The charge pipe 62 extends to the fuel tank 31. The purge pipe 63 extends to the air intake device (specifically, throttle body) of the engine 35. A fresh air introducing port 87e is formed at the lower end of the canister 45. The fresh air introducing port 87e introduces the fresh air into the canister 45. Further, a drain pipe 64 is connected to the lower end of the canister 45. The drain pipe 64 drains any water content or fuel in the canister 45 toward the outside.

A pair of rubberoid holding members 59, 59 mate with the outer peripheral face of the canister 45. The holding members 59, 59 are supported with the tank cover 52.

The fuel tank 31 includes an outer plate 65 and a bottom plate 66. The outer plate 65 constitutes the upper wall and the peripheral wall. The bottom plate 66 is joined with the lower portion of the outer plate 65. Joining the peripheral edge portion of the outer plate 65 with the peripheral edge portion of the bottom plate 66 forms the fuel tank 31 as a sealed container. The peripheral edge portion of the outer plate 65 and the peripheral edge portion of the bottom plate 66 which are joined each other form a flange 31a.

The upper portion of the outer plate 65 is provided with a fuel supply port 67. The bottom plate 66 is in a form of a curvature. The curvature has an upper portion of convex in a manner to straddle over the vehicle body frame 11 in the vehicle width direction.

To the fuel tank 31, a tank-side charge pipe 71 and a tank-side drain pipe 72 are mounted in a penetrating manner. To the canister 45, the tank-side charge pipe 71 leads the evaporative fuel staying in the gas phase of the fuel tank 31. The tank-side drain pipe 72 drains the fuel in a manner to prevent the fuel from staying around the fuel supply port 67. The tank-side charge pipe 71 penetrates in a through portion 65f provided in the upper portion of the outer plate 65. The through portion 65f is covered with the tank cover 52 from the lateral side. Further, the tank-side drain pipe 72 penetrates in a through portion 66d provided in a lower portion 66b of the bottom plate 66.

From the gas phase in the fuel tank 31, the tank-side charge pipe 71 extends to the lower side of the upper portion of the outer plate 65. One end portion of a canister-side charge pipe 62a is connected to the end portion on the outer plate 65 side of the tank-side charge pipe 71. Another end portion of the canister-side charge pipe 62a is connected to the upper end portion of the canister 45.

From around the fuel supply port 67, the tank-side drain pipe 72 extends to the lower side of the lower portion 66b of the bottom plate 66. One end portion of a drain-oriented connecting pipe 98 is connected to the end portion of the bottom plate 66 side of the tank-side drain pipe 72.

The tank-side charge pipe 71 and the canister-side charge pipe 62a constitute the charge pipe 62. Further, the tank-side drain pipe 72 and the drain-oriented connecting pipe 98 constitute the drain pipe 64.

The upper portion of the tank cover 52 is mounted to a cover supporting portion 73 provided in the outer plate 65 of the fuel tank 31.

The above is summarized as below. The entirety of the canister 45 is in a form of a cylinder. In side view, the inclination angle $\theta c$ of the canister 45 relative to the vertical line 60 is set between the inclination angle $\theta h$ of the head pipe 21 of the vehicle body frame 11 relative to the vertical line 60 and the inclination angle 0° relative to the vertical line 60. Via a stay 85, the lower end of the canister 45 is supported to the fuel tank 31. While suppressing an interference attributable to a handlebar manipulation with the front fork 12 (refer to FIG. 1), this structure can lessen bulging of the tank cover 52. Further, this structure can stably support the weight of the canister 45.

Figure 3:
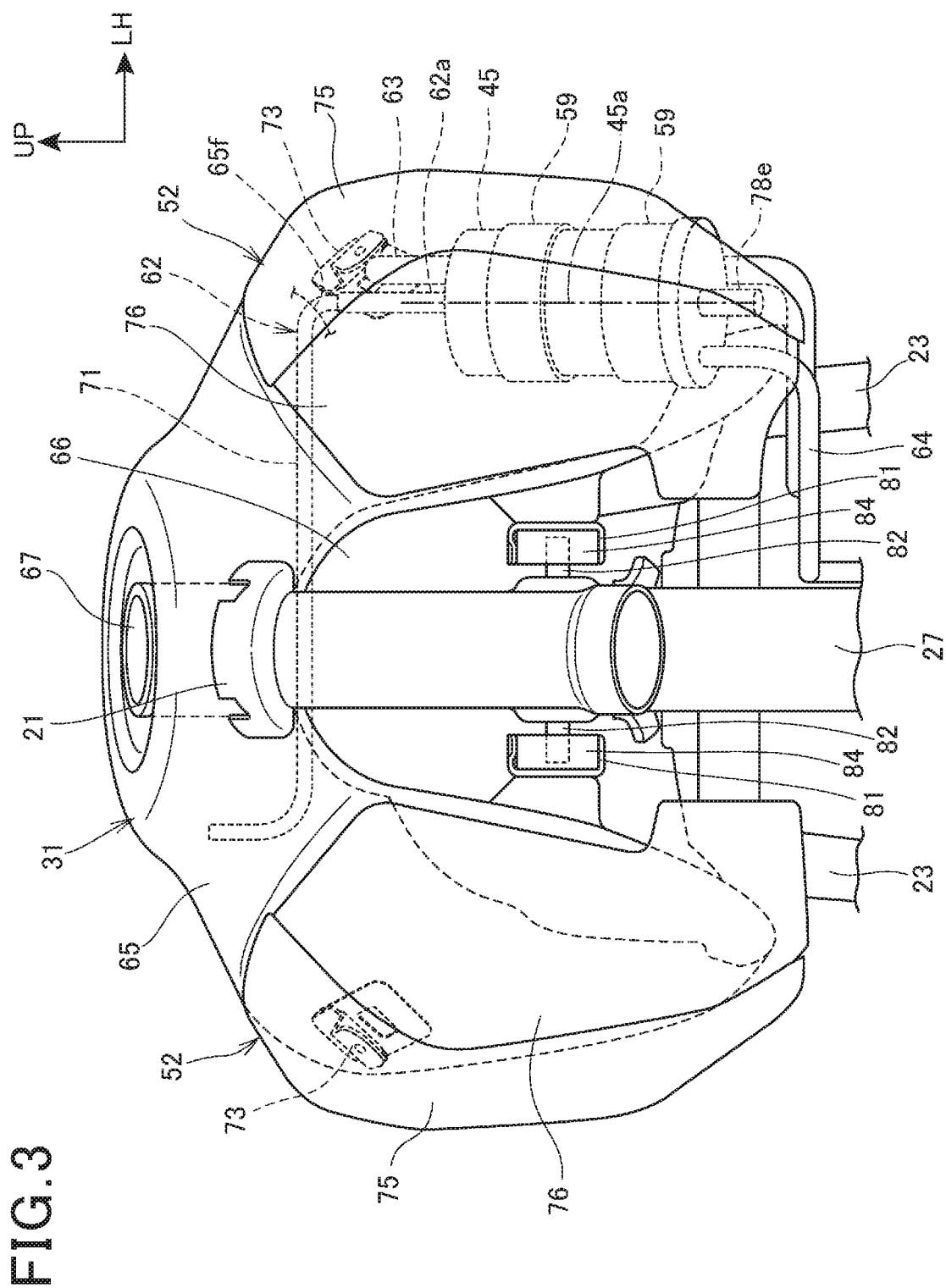
FIG. 3 is a front view showing the canister disposing structure.

FIG. 3 is a front view showing the canister 45 disposing structure.

In front view, the longitudinal direction of the canister 45 extends upward and downward. The lower end of the canister 45 is positioned downward of the lower end of the head pipe 21.

The tank cover 52 includes an outer cover 75 and an inner cover 76. The outer cover 75 forms the side face of the vehicle body. The inner cover 76 is disposed inside the outer cover 75 in the vehicle width direction. From the upside, front side and lower side of the canister 45, the inner cover 76 covers the canister 45. Thus, the canister 45 is disposed in a space 90 (refer to FIG. 9). The space 90 is surrounded by the outer plate 65 of the fuel tank 31, the outer cover 75 and the inner cover 76.

A pair of right and left supported portions 81, 81 protrude inside in the vehicle width direction. The supported portions 81, 81 are mounted to the bottom plate 66 of the fuel tank 31. A pair of right and left tank supporting portions 82, 82 protrude outside in the vehicle width direction. The vehicle body frame 11 is provided with the tank supporting portions 82, 82. Via a cushion rubber 84, the supported portions 81, 81 of the fuel tank 31 are supported to the tank supporting portions 82, 82.

In front view, the canister-side charge pipe 62a extends upward from the canister 45. Further, in front view, from the portion connecting the tank-side charge pipe 71 with the canister-side charge pipe 62a, the tank-side charge pipe 71 extends upward, followed by extending inside in the vehicle width direction. Further, in a position covered with the tank cover 52, the tank-side charge pipe 71 penetrates through the outer plate 65. Then, the tank-side charge pipe 71 passes the center of the vehicle body and extends to another side of the body (right side of vehicle body). Then, the tank-side charge pipe 71 bends upward. In front view, the purge pipe 63 extends upward from the canister 45, followed by being bent downward. The fresh air introducing port 87e is opened in the space 90 (refer to FIG. 9). In front view, after extending downward from the canister 45, the drain pipe 64 extends to inside the vehicle body. Further, on the lateral side of the vehicle body frame 11 (specifically, center frame 23 (refer to FIG. 2)), the drain pipe 64 is bent downward.

Figure 4:
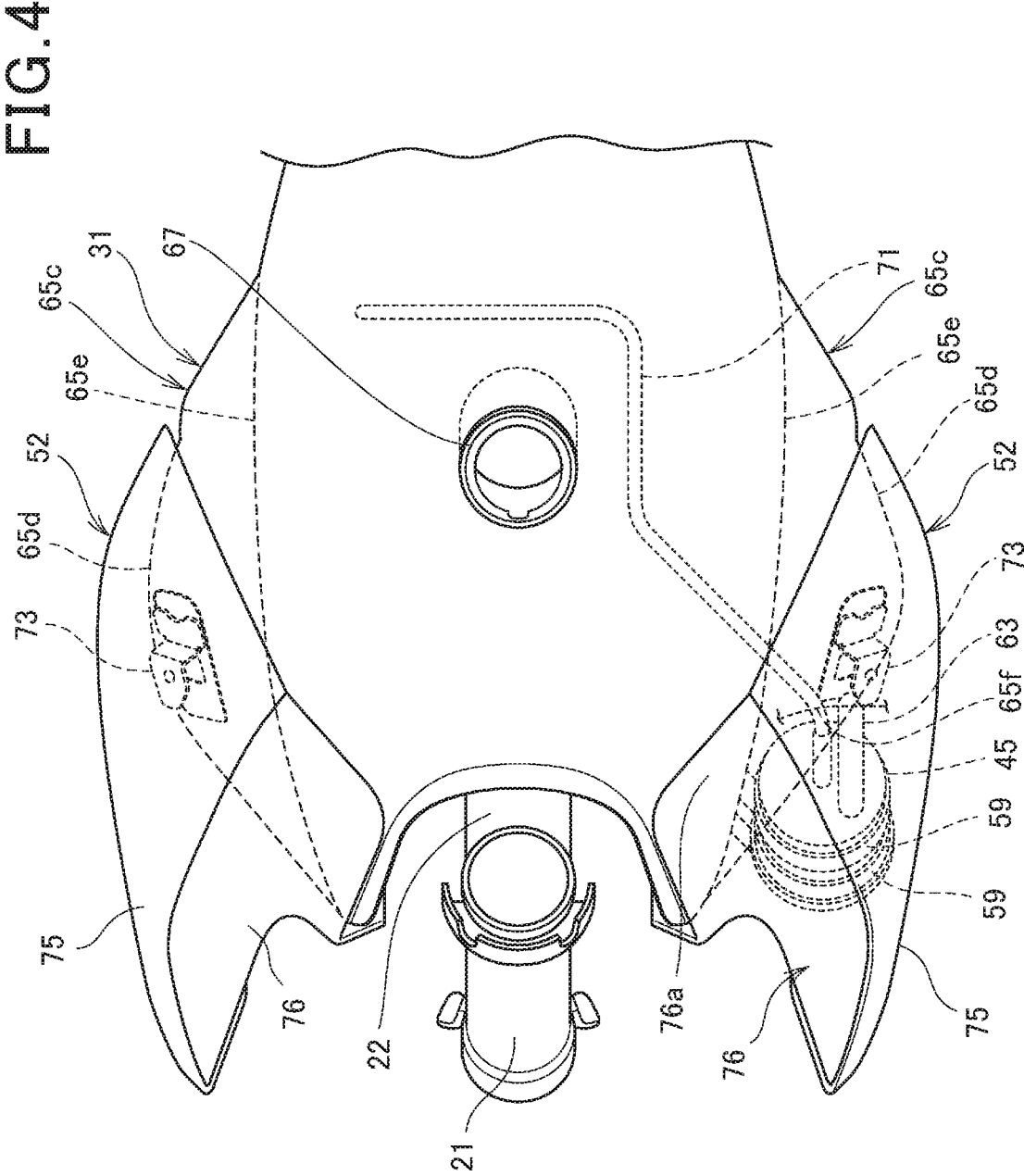
FIG. 4 is a first plan view showing the canister disposing structure.

FIG. 4 is a first plan view showing the canister 45 disposing structure.

The outer plate 65 of the fuel tank 31 forms right and left side walls 65c, 65c. In the vehicle, in the position more frontward than the fuel supply port 67, an upper portion 65d of each of the side walls 65c, 65c most bulges in an outside direction. Further, in the lateral side of the fuel supply port 67, a lower portion 65e of each of the side walls 65c, 65c most bulges in the outside direction. Then, the upper portion 65d and lower portion 65e of each of side walls 65c, 65c are gradually tapered from the most bulged portion toward the lateral side of the head pipe 21.

The canister 45 is disposed in the lateral side of the one (left) side wall 65c's portion which is gradually tapered. Due to this, the canister 45's protrusion in the lateral side can be suppressed relative to the side wall 65c's portion protruding in the outermost direction. This can suppress the outer cover 75's protrusion in the lateral side, thus making it possible to lessen the vehicle width.

The canister 45 is disposed on one side (left side) in the front portion of the fuel tank 31. The canister 45 is covered with the outer cover 75 from the outside direction. The canister 45 is covered with the outer cover 75 and the inner cover 76 from the upside. The canister 45 is covered with the inner cover 76 from the lateral side. Further, the canister 45 is covered with the fuel tank 31 from the inside direction. The canister 45 is covered with the fuel tank 31 and the outer cover 75 from the rear side. Since the tank cover 52 is provided on the other side (right side) of the fuel tank 31 as well, the canister 45 can be disposed inside the tank cover 52 on the other side.

As shown in FIG. 2 and FIG. 4 above, the charge pipe 62 is connected to the canister 45. To the canister 45, the charge pipe 62 leads the evaporative fuel generated in the fuel tank 31. In the position (specifically, a through portion 66c) where the outer plate 65 of the fuel tank 31 is covered with the tank cover 52 from the lateral side, the charge pipe 62 extends into the fuel tank 31. This structure can shorten the entire length of the charge pipe 62 (specifically, the canister-side charge pipe 62a), thus making it possible to facilitate the assembling work and suppress cost.

Figure 5:
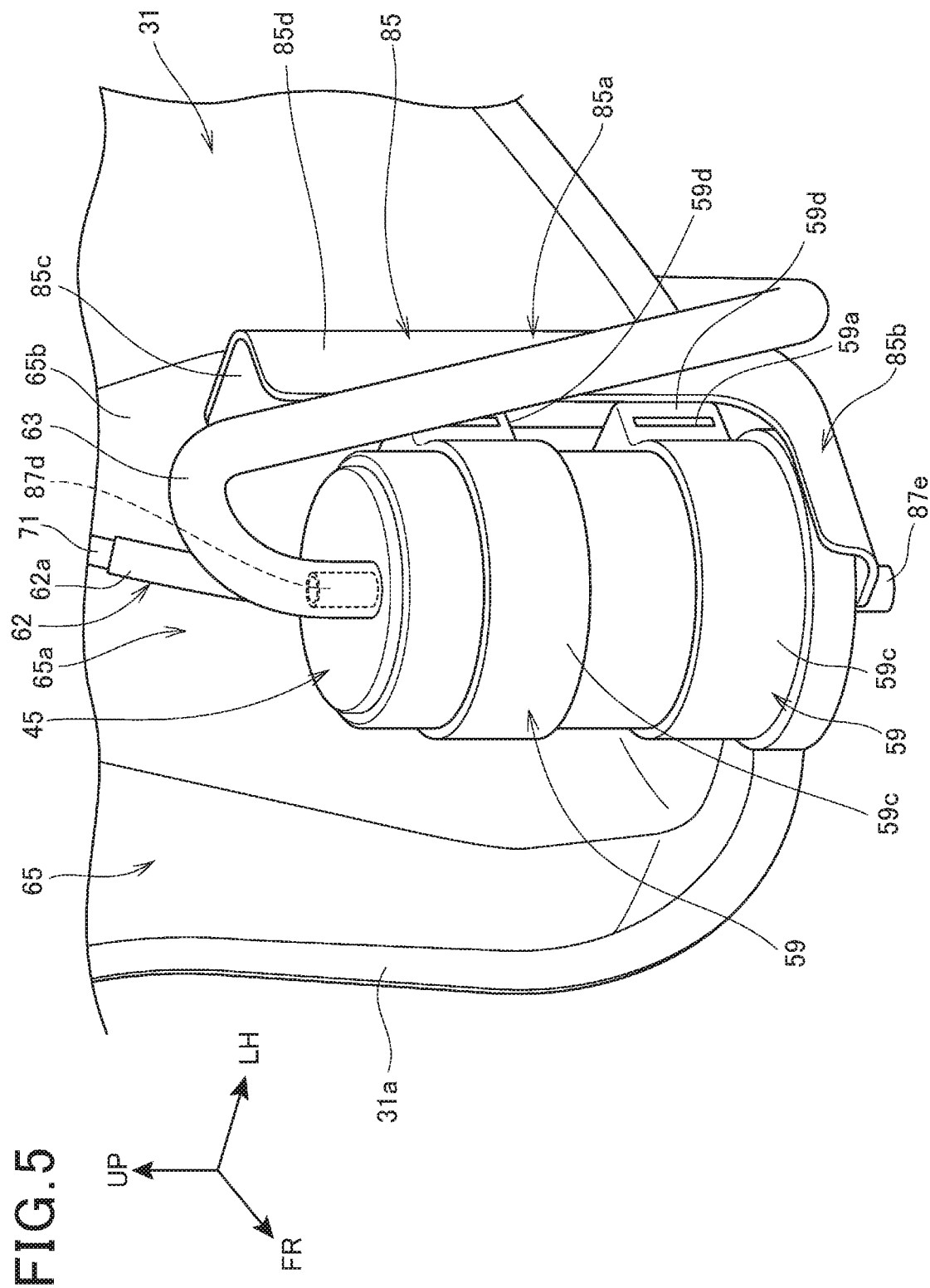
FIG. 5 is a first perspective view showing the canister supporting structure.

FIG. 5 is a first perspective view showing the canister 45 supporting structure.

A dent portion 65a is formed in the front portion of the outer plate 65 in one side portion (left portion) of the fuel tank 31. A stay 85 is mounted to an inner wall 65b of the dent portion 65a. The canister 45 is placed on the stay 85. The stay 85 is formed in a manner that a member having a cross section of an alphabetical L is bent in a form of an alphabetical L. The stay 85 has a longitudinal mounting portion 85a and a supporting portion 85b. The mounting portion 85a is mounted to the inner wall 65b. The supporting portion 85b extends frontward from the mounting portion 85a. The canister 45 is placed on the supporting portion 85b.

Further, in a spaced-apart manner, a pair of rubberoid holding members 59, 59 are mated with the outer peripheral face of the canister 45. The holding members 59, 59 are supported with protruding portions 75b, 75b (refer to FIG. 7). The protruding portions 75b, 75b are provided in the tank cover 52.

The stay 85 is so formed as to have a cross section of an alphabetical L including a base portion 85c and a rib portion 85d. The rib portion 85d is caused to rise from one edge portion of the base portion 85c. The base portion 85c of the mounting portion 85a is mounted to the inner wall 65b. The lower end portion of the canister 45 is placed on the base portion 85c of the supporting portion 85b. In this way, allowing the stay 85 to have the L-shaped cross section having the rib portion 85d can improve rigidity of the stay 85, thus making it easy to secure the rigidity for supporting the canister 45.

The purge pipe 63 extends upward from the upper end portion of the canister 45, and then is bent downward. Then, the purge pipe 63 extends downward through a through hole (not shown) formed in the stay 85. In addition, the purge pipe 63 may be so made, that the purge pipe 63 extends upward from the upper end portion of the canister 45, and then is bent rearward, then, the purge pipe 63 goes beyond the upper end of the stay 85 and then is so bent as to extend downward.

The tank-side charge pipe 71 penetrates through the through portion 65f (refer to FIG. 2 and FIG. 4) of the outer plate 65. The through portion 65f is provided in the inner wall 65b of the dent portion 65a. In this way, providing the through portion 65f in the inner wall 65b of the dent portion 65a can shorten the canister-side charge pipe 62a, thus making it possible to facilitate the piping operation and suppress cost. Further, removing the tank cover 52 can accomplish a visual contact, thus facilitating an assembling operation.

As shown above, the stay 85 is fixed to the outer plate 65 of the fuel tank 31, and the weight of the canister 45 is supported with the stay 85. With this structure, using the stay 85 can increase degree of freedom of disposing the canister 45, thus making it possible to support the canister 45 in the most suitable position in the space 90. Further, the load applied to the resinous tank cover 52 is reduced, thus improving durability.

Figure 6:
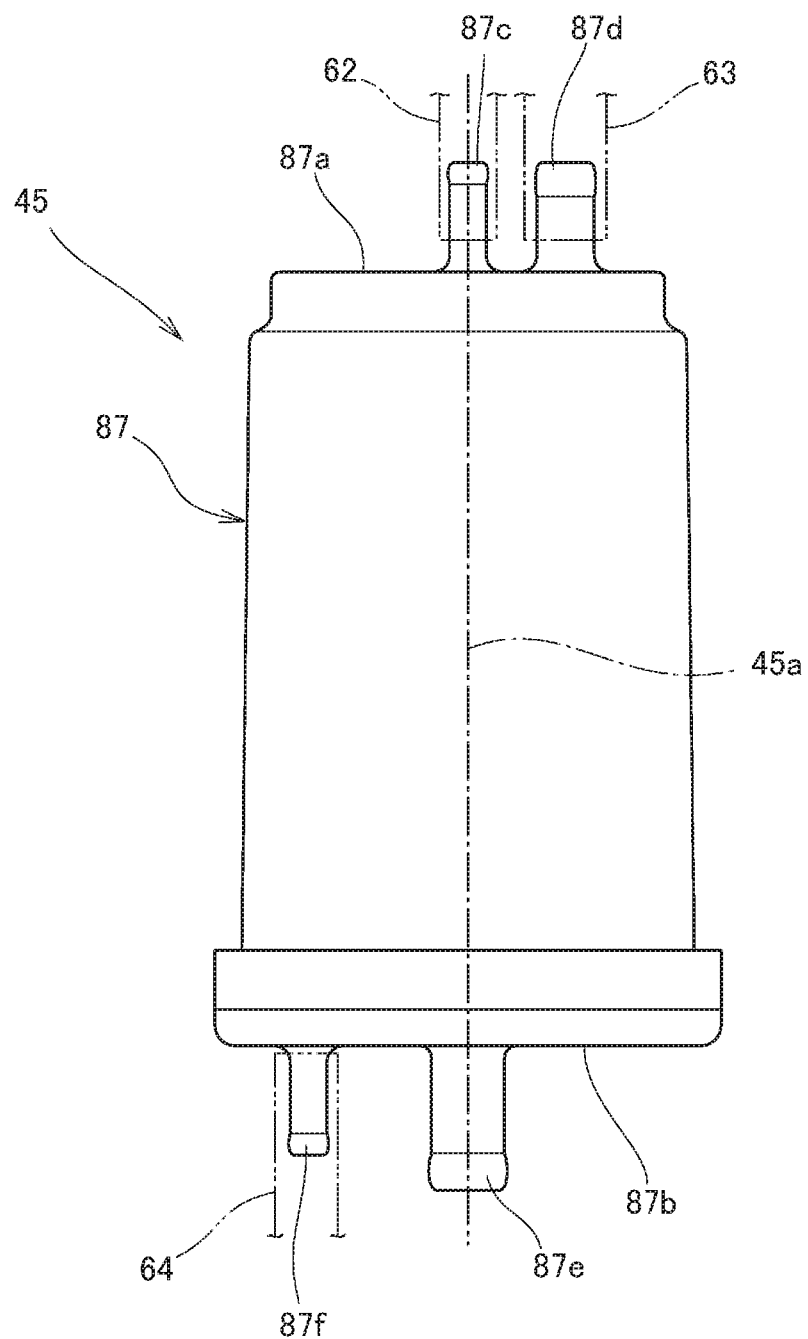
FIG. 6 is a side view showing the canister.

FIG. 6 is a side view showing the canister 45.

The canister 45 includes a cylindrical case 87 and an active carbon. The active carbon is filled in the case 87.

In respective end portions of the cylinder, the case 87 has bottom walls 87a, 87b. One bottom wall 87a is provided in the upper portion of the canister 45. A charge opening 87c and a purge opening 87d are formed in the bottom wall 87a. Another bottom wall 87b is provided in the lower portion of the canister 45. The fresh air introducing port 87e and a drain opening 87f are formed in the bottom wall 87b.

The charge pipe 62 is connected to the charge opening 87c. The purge pipe 63 is connected to the purge opening 87d. Further, the drain pipe 64 is connected to the drain opening 87f. The fresh air introducing port 87e is free from connection of any pipe. The fresh air introducing port 87e is opened to the space around the canister 45. In this way, providing the fresh air introducing port 87e in the lower portion of the canister 45 allows the cylindrical case 87 itself to cover the fresh air introducing port 87e from the upside. Due to this, even a simple structure free from a fresh air introducing pipe can further prevent entry of water, dust, etc. into the canister 45 from the fresh air introducing port 87e.

Figure 7:
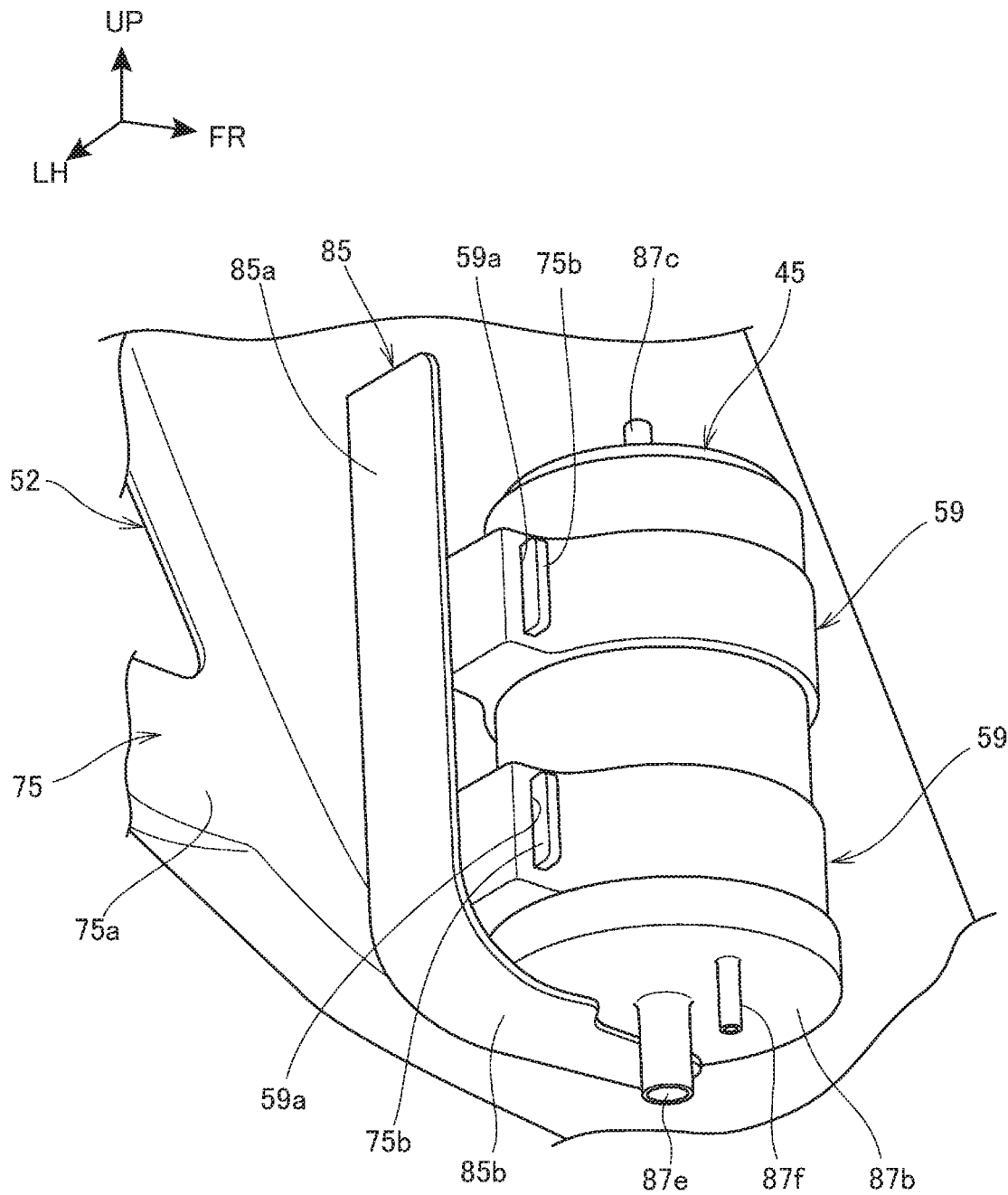
FIG. 7 is a second perspective view showing the canister supporting structure.

FIG. 7 is a second perspective view showing the canister 45 supporting structure. From the center side of the vehicle, FIG. 7 shows the circumference of the canister 45 by omitting the outer plate 65 (refer to FIG. 3) and the bottom plate 66 (refer to FIG. 3).

An inner face 75a of the outer cover 75 of the tank cover 52 is formed with a pair of protruding portions 75b, 75b. The protruding portions 75b, 75b protrude inward in the vehicle body. The protruding portions 75b, 75b are press-fitted into through holes 59a, 59a which are respectively formed on the holding members 59, 59. This positions the canister 45 to the outer cover 75 (specifically, protruding portions 75b, 75b) via the holding members 59, 59.

The protruding portion 75b has a cross section formed into a longitudinal rectangle. This can further enlarge the cross sectional coefficient of the protruding portion 75b, thus making it possible to enhance rigidity. This can firmly support the canister 45.

Further, the bottom wall 87b of the canister 45 is placed on the stay 85 (specifically, the supporting portion 85b) on the side of the fuel tank 31, supporting the weight of the canister 45. Accordingly, the canister 45 can be supported both by the fuel tank 31 and the tank cover 52. Thus, this also can improve durability of the tank cover 52.

As shown in FIG. 5 and FIG. 7 above, the canister 45 is positioned in the tank cover 52, and the weight of the canister 45 is supported with the fuel tank 31. With a high positioning accuracy, this structure can support the canister 45 to any of the fuel tank 31 and the tank cover 52. Further, this structure can be free from any wasteful clearance. Thus, this structure makes it possible to accomplish miniaturizing of the space 90 and the circumference of the space 90, leading to a compactness.

Figure 8:
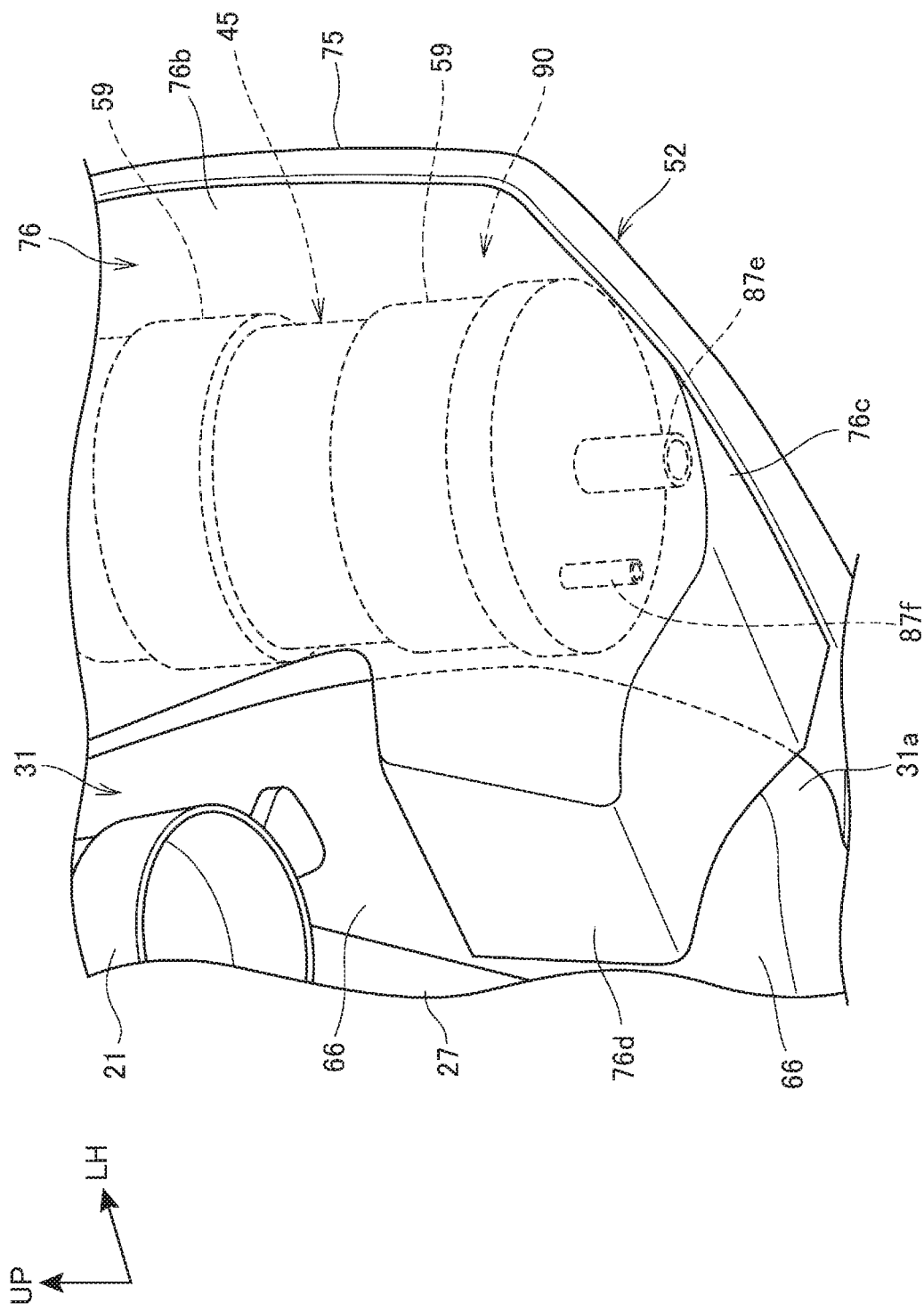
FIG. 8 is a perspective view showing the inner cover for covering the canister.

FIG. 8 is a perspective view showing the inner cover 76 covering the canister 45.

The inner cover 76 covers the lower side and the inside direction of the canister 45, in addition to the upside and front side of the canister 45. Specifically, the inner cover 76 is integrated with an upper portion 76a (refer to FIG. 4), a front portion 76b, a bottom portion 76c and an inside portion 76d. The upper portion 76a, the front portion 76b, the bottom portion 76c and the inside portion 76d cover the canister 45 respectively from the upside, the front side, the lower side and the inside direction.

There is a certain portion where the edge portion of each of the upper portion 76a, front portion 76b and bottom portion 76c of the inner cover 76 is connected with the fuel tank 31 and the outer cover 75. A dust-proof structure shown in the following drawing is provided in the certain portion.

From the inside direction of the canister 45 to the inside of the bottom plate 66 of the fuel tank 31 in the vehicle width direction, the inside portion 76d of the inner cover 76 extends along the flange 31a and the bottom plate 66.

As shown in FIG. 1, FIG. 2 and FIG. 8 above, in the rear side of the front wheel 13, the engine 35 is installed to the vehicle body frame 11, while, in the upper side of the engine 35, the fuel tank 31 is supported to the vehicle body frame 11. The fuel tank 31 is covered with the tank cover 52 from the lateral side. The tank cover 52 extends more forward than at least the fuel tank 31. In the motorcycle 10 as a saddle riding vehicle 10, the side view shows that, in a position where the canister 45 overlaps with the fuel tank 31 in height, the canister 45 is covered with the tank cover 52 from the lateral side.

The canister 45 has the fresh air introducing port 87e for introducing the fresh air into the canister 45. The fresh air introducing port 87e is opened in the space 90 formed by at least the tank cover 52.

With this structure, the space 90 formed by at least the tank cover 52 can be disposed in the front side and the upside of the engine 35. Accordingly, this structure prevents entry of any dust or water splash, and scarcely has a possibility of swamp. Thus, even a simple structure free from a fresh air introducing pipe connected to the fresh air introducing port 87e can prevent entry of any dust or water into the canister 45 and can keep performance of the canister 45 for a long time.

Figure 9:
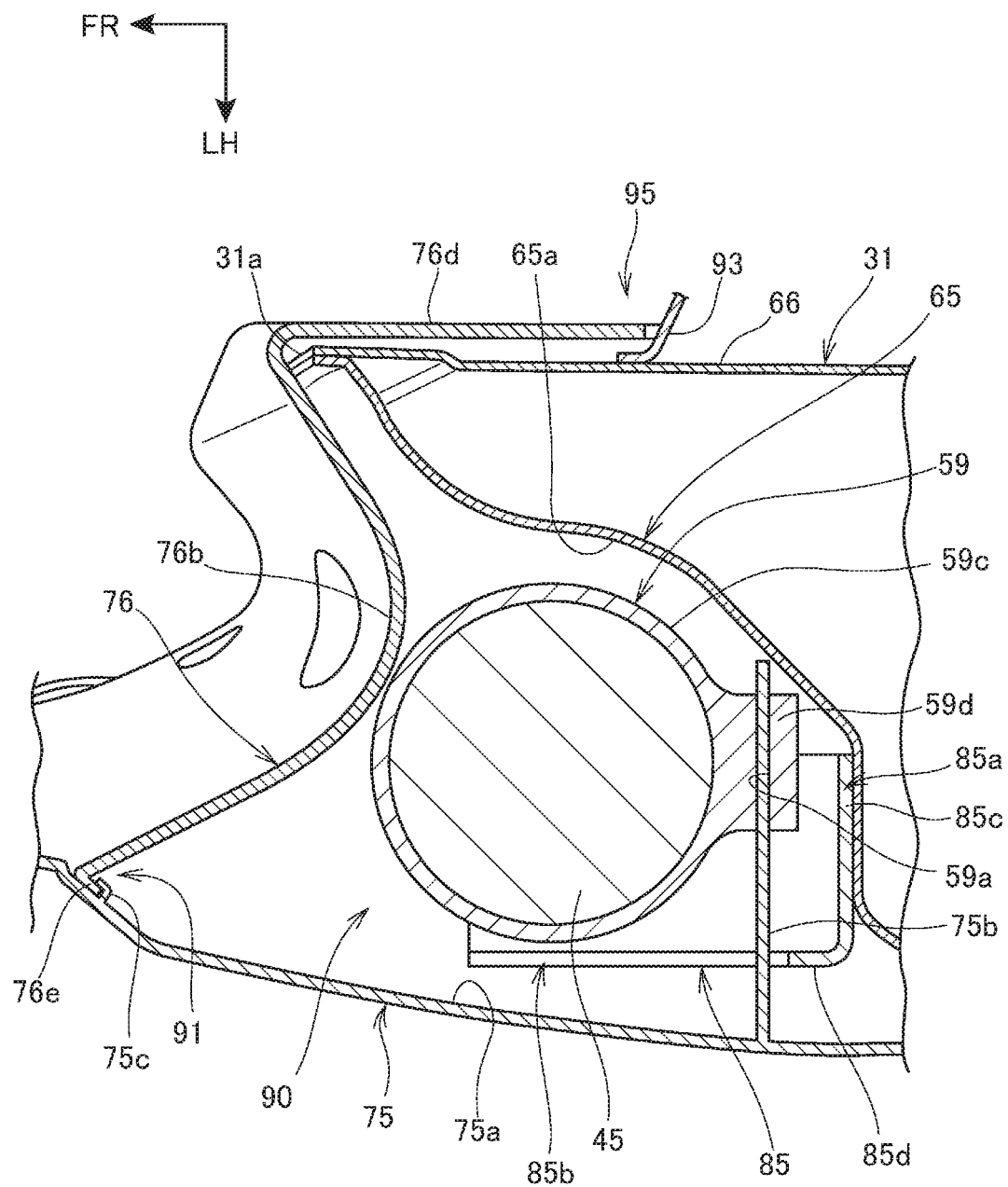
FIG. 9 is a cross sectional view cutting the canister and the circumference of the canister in a direction orthogonal to the longitudinal direction of the canister.

FIG. 9 is a cross sectional view cutting the canister 45 and the circumference of the canister 45 in a direction orthogonal to the longitudinal direction of the canister 45.

The space 90 is surrounded by the outer plate 65 of the fuel tank 31, the outer cover 75 and the inner cover 76. The canister 45 is disposed in the space 90.

A dust-proof structure is adopted between the outer cover 75 and the edge portion of the inner cover 76. Further, another dust-proof structure is adopted between the bottom plate 66 of the fuel tank 31 and the edge portion of the inner cover 76.

Specifically, an L-shaped protrusion 75c having an L-shaped cross section is integrated with the inner face 75a of the outer cover 75. Meanwhile, a bent portion 76e bent in the rearward direction of the vehicle is formed at the outside edge portion of the inner cover 76. The bent portion 76e is engaged with the L-shaped protrusion 75c opened in the frontward direction of the vehicle. Accordingly, an outside engaging portion 91 is formed. The outside engaging portion 91 has a labyrinth structure. Thus, the outside engaging portion 91 brings about a dust-proof effect against the space 90. Further, the outside engaging portion 91 can suppress entry of any rain water into the space 90.

Further, a protruding plate 93 protrudes to the center side in the vehicle width direction, and the protruding plate 93 is mounted to the bottom plate 66 of the fuel tank 31. Meanwhile, the inside portion of the inner cover 76 in the vehicle width direction is bent in the rearward direction of the vehicle, to thereby form the inside portion 76d. The inside portion 76d is caused to be along the bottom plate 66 and adjacent to the bottom plate 66. Further, the rear end portion of the inside portion 76d is caused to be adjacent to or abut on the protruding plate 93.

The protruding plate 93, the bottom plate 66 and the inside portion 76d form an inside mating portion 95. The inside mating portion 95, like the outside engaging portion 91, has a labyrinth structure, to thereby bring about a dust-proof effect against the space 90. Further, the inside mating portion 95 can suppress entry of rain water into the space 90.

In the rearward direction of the vehicle, the front portion 76b of the inner cover 76 is curved in a form of a convex. This can prevent the front fork 12 (refer to FIG. 1) from interfering, at the time of handlebar steering, with the inner cover 76.

The holding member 59 is an integration of an annular portion 59c with a protruding holding portion 59d. The annular portion 59c is mated with the outer peripheral face of the canister 45. From the annular portion 59c, the protruding holding portion 59d protrudes to the outside in the radial direction. The protruding holding portion 59d is disposed on the rear side of the canister 45. The protruding portion 75b of the outer cover 75 is press-fitted into a through hole 59a opened in the protruding holding portion 59d. The holding member 59 is made of rubber, and the protruding portion 75b is press-fitted into the through hole 59a, thus making it possible to enhance the force coupling the protruding holding portion 59d with the protruding portion 75b. This can suppress the movement of the holding member 59 relative to the protruding portion 75b. Further, the rubberoid holding ember 59 serves as a vibration-proof member, thus preventing any vehicle body vibration from being transmitted from the outer cover 75 to the canister 45.

As shown above, the tank cover 52 includes the outer cover 75 and the inner cover 76. The outer cover 75 serves as a cover body constituting the side face of the vehicle body. The inner cover 76 covers the inside of the outer cover 75 in the vehicle width direction. At least the portion (outside engaging portion 91 and inside mating portion 95) for connecting the outer cover 75 with the inner cover 76 serves as a dust-proof structure. This structure can suppress entry of any dust or water splash into the space 90 formed by at least the outer cover 75 and inner cover 76.

Figure 10:
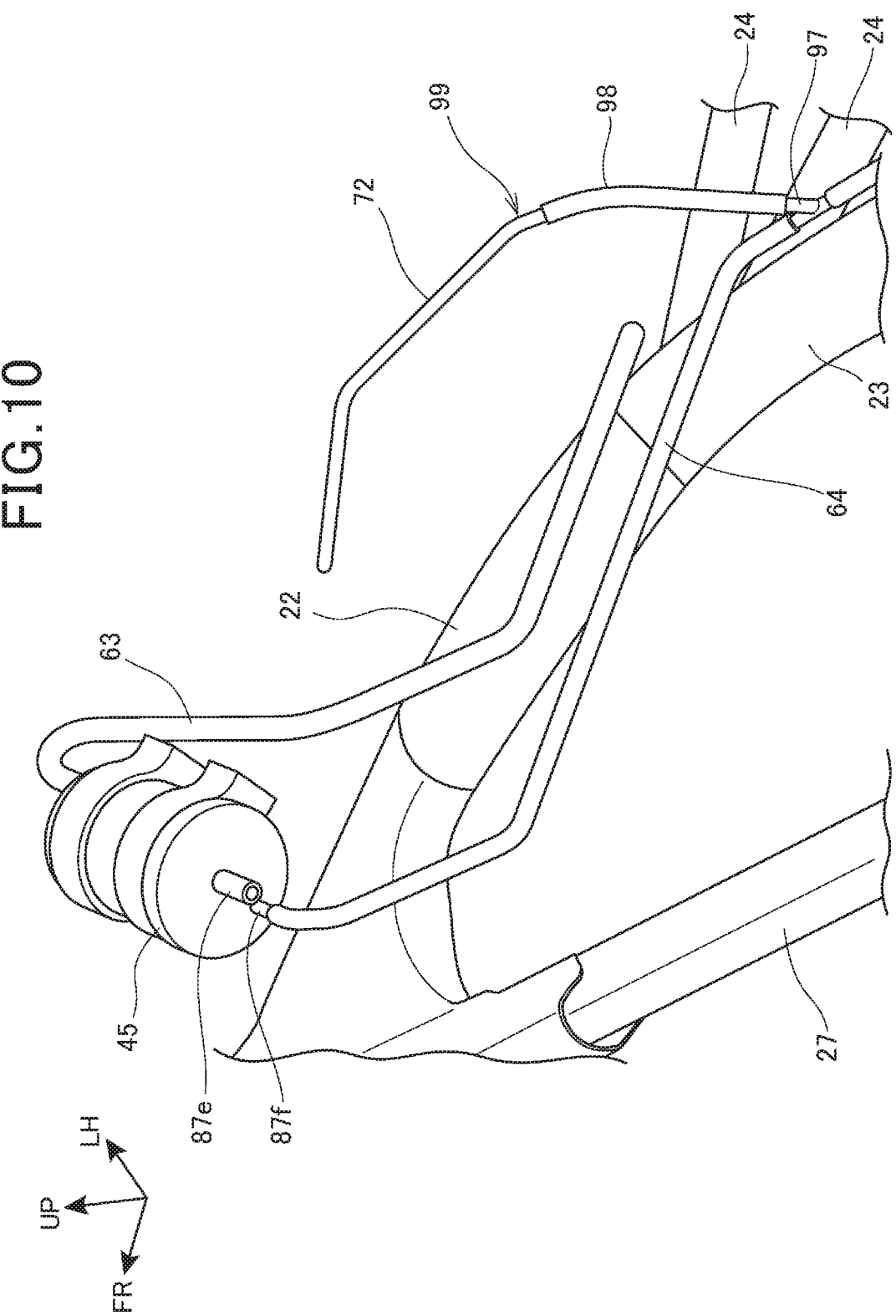
FIG. 10 is a perspective view showing a disposition of each pipe connected to the canister.

FIG. 10 is a perspective view showing a disposition of each pipe connected to the canister 45.

In FIG. 2 and FIG. 10, from the upper end portion of the canister 45, the purge pipe 63 extends downward in the rear side of the canister 45. Further, the purge pipe 63 extends inward and obliquely rearward in the vehicle width direction. Further, the purge pipe 63 extends rearward to be connected to the air intake device 34 (refer to FIG. 1) of the engine 35 (refer to FIG. 1).

Further, the fresh air introducing port 87e is opened downward. From the lower end portion of the canister 45, the drain pipe 64 is curved to extend inward and obliquely rearward in the vehicle width direction. Then, the drain pipe 64 extends rearward. Further, on the lateral side of the center frame 23, the drain pipe 64 is curved to extend downward and obliquely rearward. Then, the drain pipe 64 reaches the lower portion of the vehicle body. A three-directional pipe joint 97 is provided on the way of the drain pipe 64 (specifically, the drain pipe 64's portion positioned on the lateral side of the center frame 23). The lower end portion of the drain-oriented connecting pipe 98 is connected to the three-directional pipe joint 97. The drain-oriented connecting pipe 98 has an upper end portion connected to the lower end portion of the tank-side drain pipe 72. The tank-side drain pipe 72 extends from the fuel tank 31 (refer to FIG. 2). The tank-side drain pipe 72 and the drain-oriented connecting pipe 98 constitute a supplied-fuel drain pipe 99.

In this way, the three-directional pipe joint 97 works to merge the drain pipe 64 of the canister 45 with the supplied-fuel drain pipe 99 of the fuel tank 31. Compared with extending, to the lower portion of the vehicle body, the drain pipe 64 separately from the supplied-fuel drain pipe 99, this merging can facilitate any piping operation and suppress cost.

As shown in FIG. 2 and FIG. 10 above, the drain pipe 64 is connected to the canister 45. The drain pipe 64 drains a liquid in the canister 45 to the outside of the canister 45. The drain pipe 64 extends rearward at the height same as or higher than the lower end of the tank cover 52. The supplied-fuel drain pipe 99 drains the fuel around the fuel supply port 67 of the fuel tank 31. Then, the drain pipe 64 merges with the supplied-fuel drain pipe 99. Then, the drain pipe 64 extends to the lower portion of the vehicle body. Being free from the conventional pipe extending downward from the tank cover, this structure prevents the drain pipe 64 from being exposed to an outside. Accordingly, this structure improves design. Further, this structure can simplify the piping operation associated with the fuel tank 31.

Figure 11:
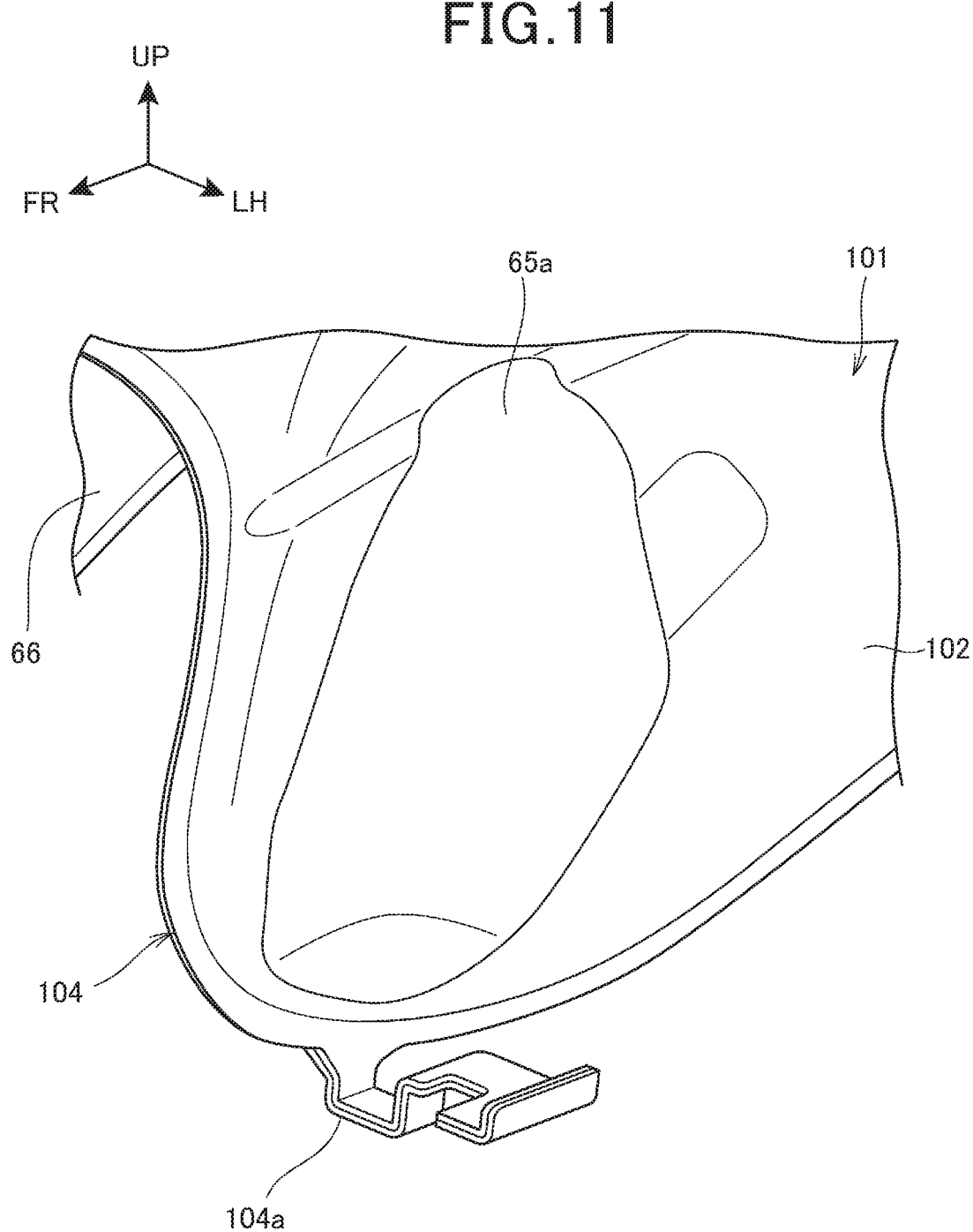
FIG. 11 is a perspective view showing another embodiment of the canister supporting structure.

FIG. 11 is a perspective view showing another embodiment of the canister supporting structure.

In the other embodiment shown below, any structural element same as that of the first embodiment shown in FIG. 5 will be added by the same symbol, and detailed description of such an element will be omitted.

A fuel tank 101 includes an outer plate 102 and the bottom plate 66. The outer plate 102 serves as an upper wall and a peripheral wall of the fuel tank 101. The bottom plate 66 is joined with the lower portion of the outer plate 102. A flange 104 serves as a portion for joining the peripheral edge portion of the outer plate 102 with the edge portion of the bottom plate 66. The lower portion on the front side of the flange 104 is integrated with a sideward protruding portion 104a protruding sideward. The canister 45 (refer to FIG. 5) is placed on the tip end portion of the sideward protruding portion 104a. Further, like the first embodiment, the canister 45 is supported with the outer cover 75 (refer to FIG. 7) as well.

In this way, allowing a portion of the fuel tank 101 to directly support the canister 45 can reduce the number of parts, thus reducing cost.

As shown above, the fuel tank 101 includes the bottom plate 66 fixed to the outer plate 102. The peripheral edges of the respective outer plate 102 and bottom plate 66 are fixed, to thereby form the flange 104. The flange 104 extends toward the bottom face of the canister 45. The flange 104 supports the weight of the canister 45. This structure can reduce the number of parts.

Second Embodiment

Figure 12:
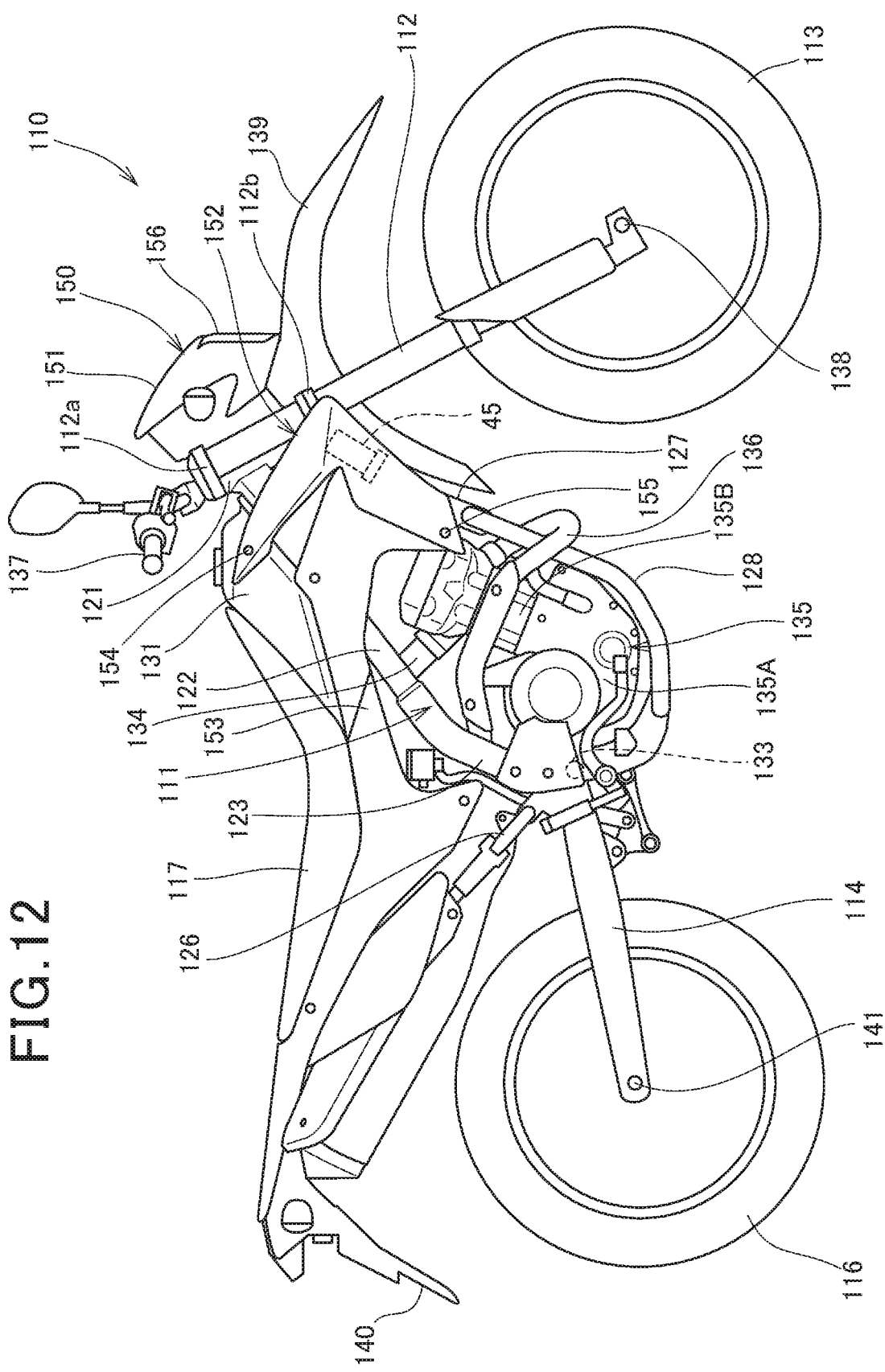
FIG. 12 is a right side view of a motorcycle including a canister disposing structure, according to a second embodiment of the present invention.

FIG. 12 is a right side view of a motorcycle 110 including a canister disposing structure, according to a second embodiment of the present invention.

The motorcycle 110 includes a front wheel 113, a rear wheel 116 and a seat 117. Via a front fork 112, the front wheel 113 is supported to the front end portion of a vehicle body frame 111. Via a swing arm 114, the rear wheel 116 is supported to the lower portion of the vehicle body frame 111. The seat 117 is supported to the upper portion of the vehicle body frame 111.

The vehicle body frame 111 includes a head pipe 121, a pair of right and left main frames 122, a pair of right and left center frames 123, a pair of right and left seat rails, a pair of right and left sub-frames 126, a down frame 127 and a pair of right and left lower frames 128.

The head pipe 121 is disposed in the front end portion of the vehicle body frame 111. From the head pipe 121, the main frame 122 extends rearward and obliquely downward, supporting the fuel tank 131. From the rear end of the main frame 122, the center frame 123 extends downward. A pivot shaft 133 extending the vehicle width direction is mounted to the center frame 123. The seat rail extends rearward from the intermediate portion of the main frame 122, and the seat rail supports the seat 117. The sub-frame 126 is mounted to across the center frame 123 and the seat rail. In a position lower than the main frame 122, the front end of the down frame 127 is mounted to the head pipe 121. The down frame 127 extends downward and obliquely rearward rail from the head pipe 121. The lower frame 128 extends downward and obliquely rearward from the lower end of the down frame 127. The rear end of the lower frame 128 is coupled with the lower end of the center frame 123. Together with center frame 123 and the down frame 127, the lower frame 128 supports an engine 135.

The front fork 122 includes a top bridge 112a and a bottom bridge 112b which connect the right with the left. A steering stem runs across the upper and the lower between the top bridge 112a and the bottom bridge 112b. The steering stem is rotatably supported to the head pipe 121. This can allow the front fork 112 to be steerably supported to the head pipe 121.

A handlebar 137 is mounted to the upper face of the top bridge 112a. Via an axle shaft 138, the front wheel 113 is supported to the lower end portion of the front fork 112. The front wheel 113 is covered with a front fender 139 from the upside.

The front end portion of the swing arm 114 is supported to the pivot shaft 133 in a manner to swing upward and downward. Via an axle shaft 141, the rear wheel 116 is supported to the rear end portion of the swing arm 114. The rear wheel 116 is covered with a rear fender 140 from the upside.

The engine 135 includes a crankcase 135A and a cylinder portion 135B. While being inclined frontward from the front portion of the crankcase 135A, the cylinder portion 135B extends upward. An air intake device 134 includes a throttle body and an air cleaner. The air intake device 134 is connected to the rear portion of the cylinder portion 135B. An exhaust device 136 is connected to the front portion of the cylinder portion 135B.

The upper portion of the vehicle body frame 111 is covered with a vehicle body cover 150. The vehicle body cover 150 includes a front cowl 151, a pair of right and left shrouds 152 and a pair of right and left side covers 153.

The front cowl 151 covers the head pipe 121 and the upper portion of the front fork 112 from the front side. A head light 156 is disposed in the front cowl 151. The pair of right and left shrouds 152 are formed into an alphabetical V in side view. The shrouds 152 are mounted to the vehicle body frame 111 (specifically, down frame 127) and the fuel tank 131. The shroud 152 covers the lateral side of a part of the main frame 122 and the lateral side of the down frame 127. A side cover 153 covers the lower side of each of the fuel tank 131 and the seat 117.

The canister 45 is disposed inside the shroud 152 in the vehicle width direction. The canister 45 is supported with the shroud 152. The canister 45 is disposed in a position higher than either the upper end of the front wheel 113 or the upper end of the rear wheel 116 whichever is lower.

Figure 13:
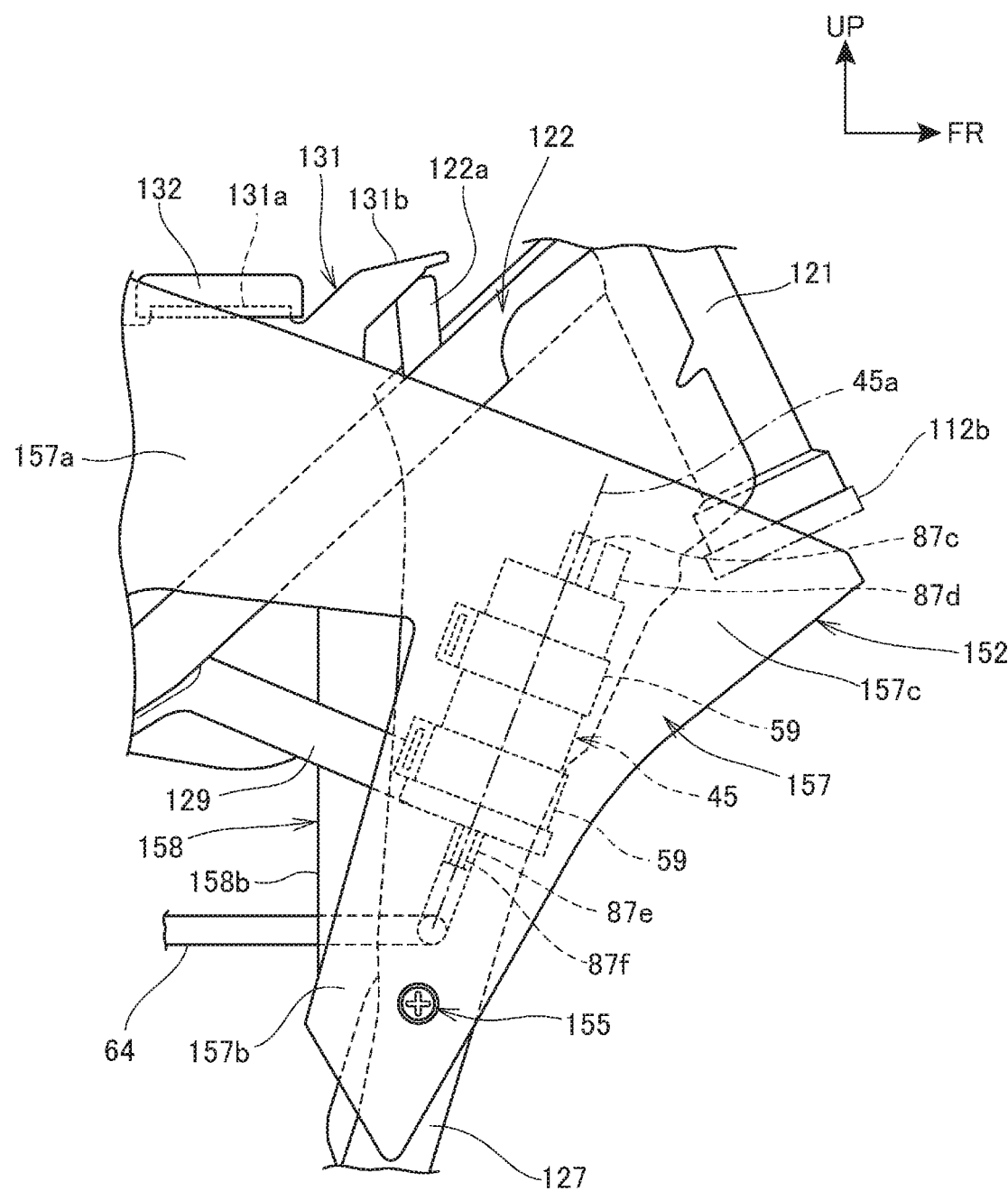
FIG. 13 is a right side view showing the canister disposing structure.

FIG. 13 is a right side view showing the canister 45 disposing structure.

A reinforcing frame 129 runs across the main frame 122 and the down frame 127.

The shroud 152 includes an outer shroud 157 and an inner shroud 158. The outer shroud 157 forms a part of the side face of the vehicle body. The inner shroud 158 is disposed inside the outer shroud 157 in the vehicle width direction.

In side view, the canister 45 is positioned forward of the fuel tank 131 and on the lateral side of the down frame 127. From the outside direction, the canister 45 is covered with the outer shroud 157. From the inside direction, the canister 45 is covered with the inner shroud 158. That is, the canister 45 is disposed between the outer shroud 157 and the inner shroud 158. Further, a part of the canister 45 (specifically, the charge opening 87c and purge opening 87d of the canister 45) is positioned upward of the lower end of the bottom bridge 112b.

Like the first embodiment, the canister 45 is supported, via the holding members 59, 59, to a pair of protruding portions extending from the inner face of the outer shroud 157.

The axis line 45a of the canister 45 is inclined frontward in a manner to be along the down frame 127.

Like the fuel tank 31 (refer to FIG. 2) according to the first embodiment, a pipe is connected to the fuel tank 131. Further, like the first embodiment, each pipe is connected to the canister 45 as well.

The drain pipe 64 is connected to the drain opening 87f of the canister 45. From the drain opening 87f along the axis line 45a, the drain pipe 64 extends rearward and obliquely downward. Then, the drain pipe 64 is bent rearward of the vehicle. Then, the drain pipe 64 merges with the supplied-fuel drain pipe 99 (refer to FIG. 10) and extends to the lower portion of the vehicle body.

Further, part of or entirety of the pipe's connections to the fuel tank 131 and to the canister 45 may be differentiated from those according to the first embodiment.

The outer shroud 157 is an integration in a form of an alphabetical V including an upper shroud 157a and a lower shroud 157b. The upper shroud 157a is mounted to the side face of the fuel tank 131. The lower shroud 157b is mounted to the down frame 127. A fastening portion 154 (refer to FIG. 12) fastens the fuel tank 131 with the upper shroud 157a. A fastening portion 155 fastens the down frame 127 with the lower shroud 157b.

A connecting portion 157c connects the upper shroud 157a with the lower shroud 157b. The lower shroud 157b is disposed below the connecting portion 157c. The canister 45 is so disposed that, in side view, the canister 45 overlaps with the connecting portion 157c and with the lower shroud 157b.

A fuel supply port 131a is provided in the upper portion of the fuel tank 131. The fuel supply port 131a is covered with a cap 132. From the upper portion of the front end portion of the fuel tank 131, a front portion mounting portion 131b protrudes forward and obliquely upward. In the front end portion of the main frame 122, a tank supporting portion 122a is so disposed as to protrude upward. The front portion mounting portion 131b is mounted to the tank supporting portion 122a.

Figure 14:
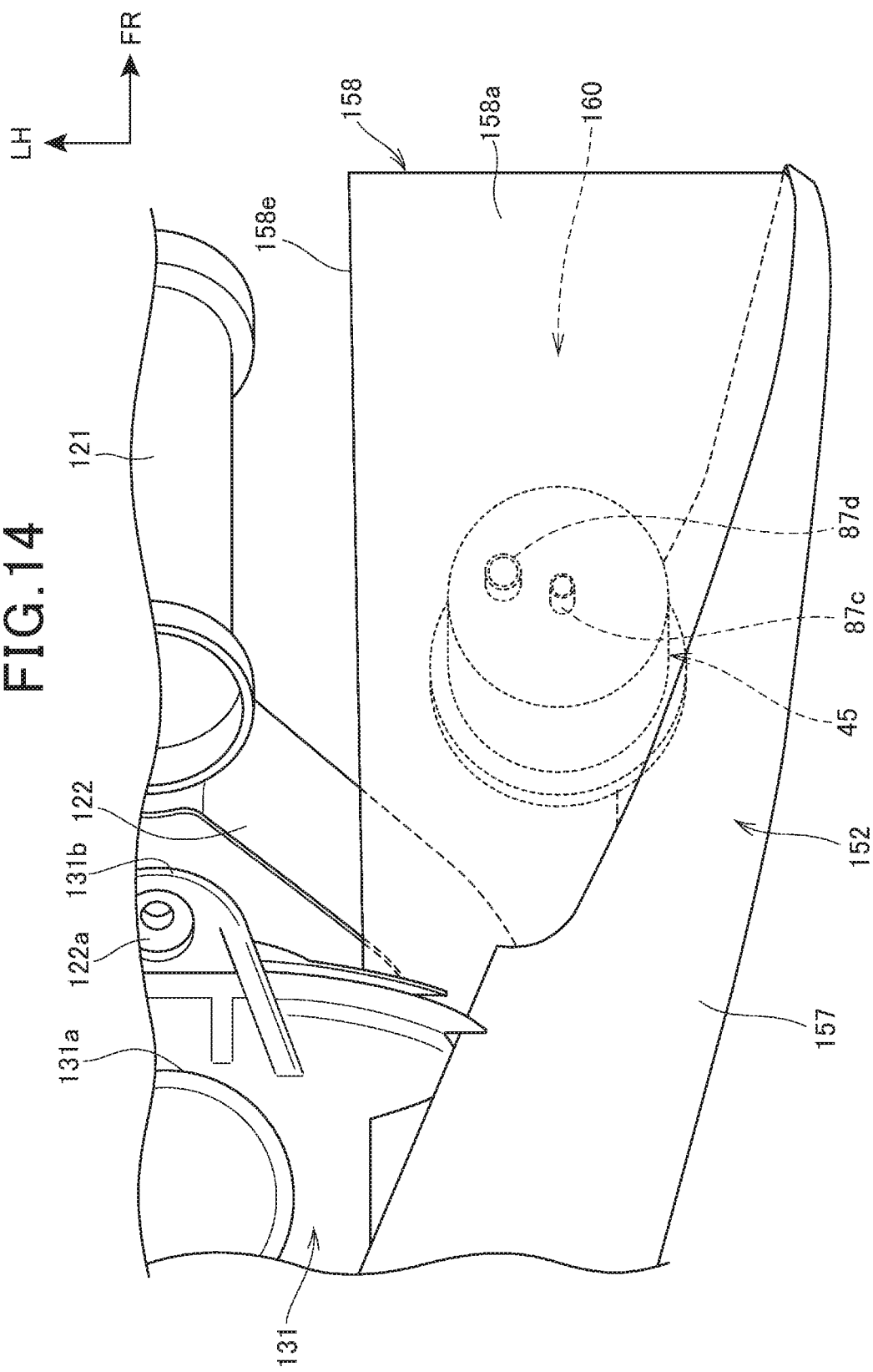
FIG. 14 is a second plan view showing the canister disposing structure.
Figure 15:
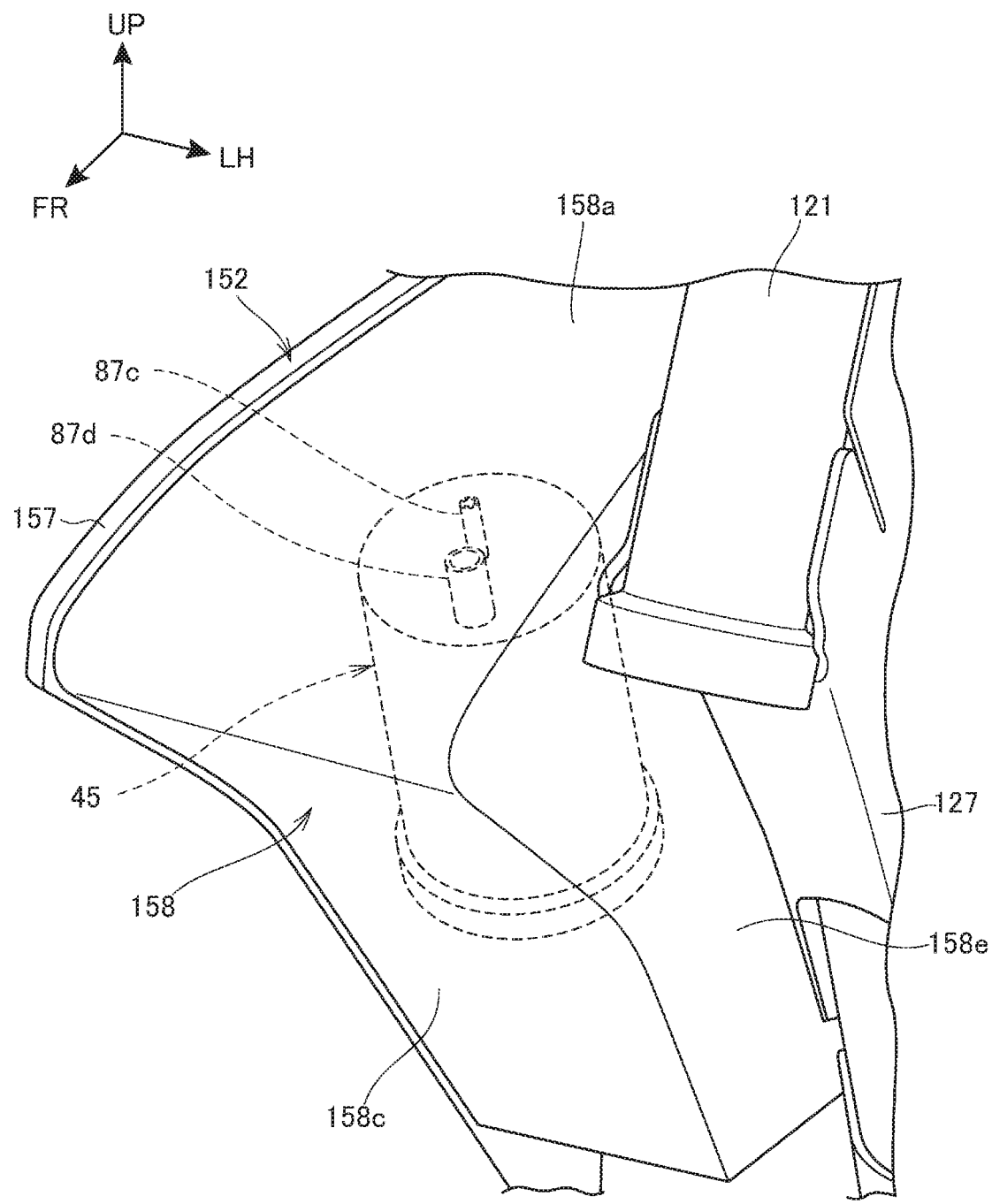
FIG. 15 is a first perspective view of the canister disposing structure.
Figure 16:
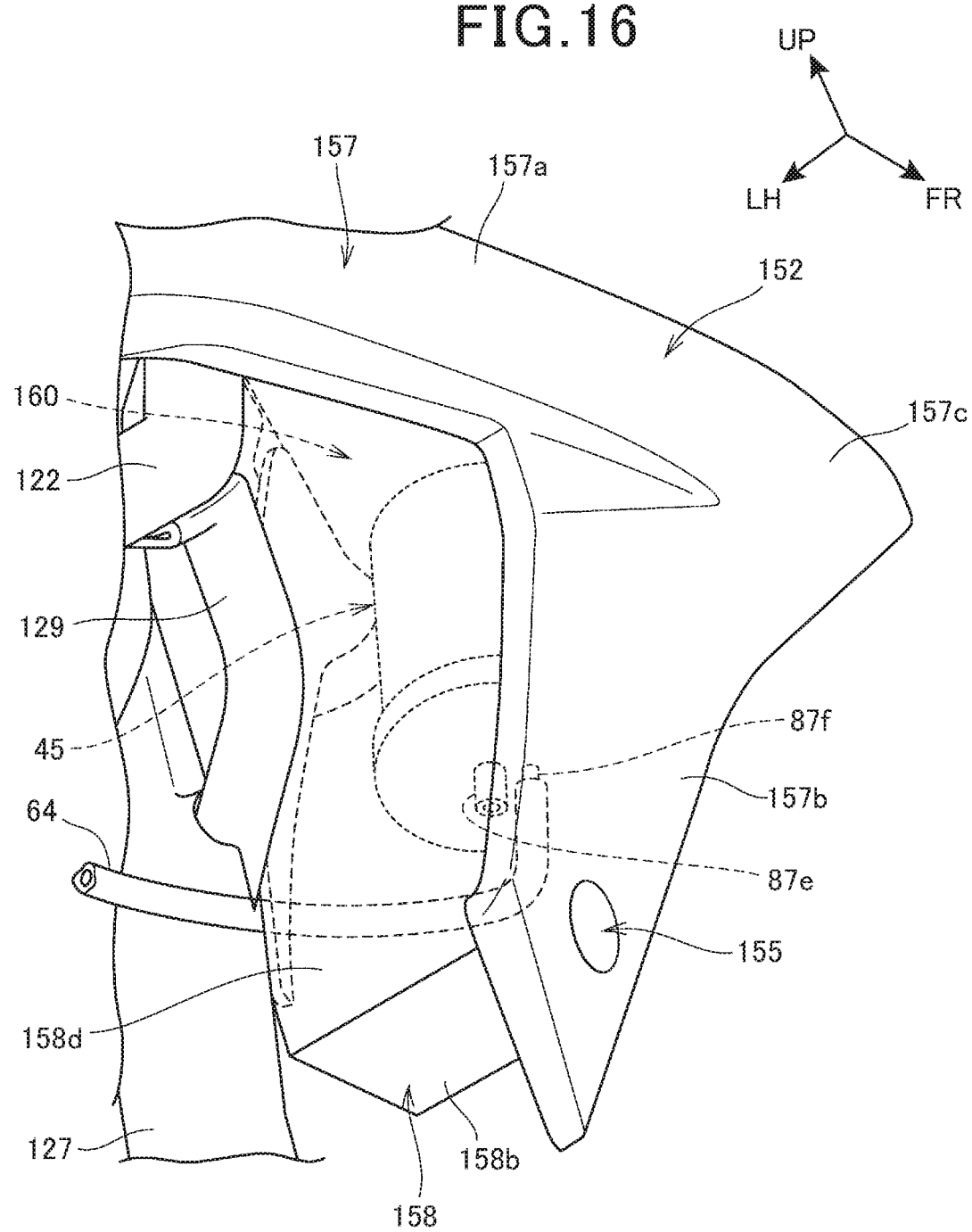
FIG. 16 is a second perspective view of the canister disposing structure.

FIG. 14 is a second plan view showing the canister 45 disposing structure. FIG. 15 is a first perspective view of the canister 45 disposing structure. FIG. 16 is a second perspective view of the canister 45 disposing structure.

As shown in FIG. 14 to FIG. 16, the inner shroud 158 is disposed inside the outer shroud 157 in the vehicle width direction. The canister 45 is disposed in a space 160 surrounded by the outer shroud 157 and the inner shroud 158.

The inner shroud 158 is a pentahedron including an upper wall 158a, a lower wall 158b, a front wall 158c, a rear wall 158d and an inside wall 158e. An opening provided on an outside portion of the inner shroud 158 is covered with the outer shroud 157.

In the space 160, the canister 45 is connected with the charge pipe 62, the purge pipe 63 and the drain pipe 64 which are shown in FIG. 2.

In FIG. 14 to FIG. 16, a dust-proof structure like that according to the first embodiment is disposed between the portion for connecting the outer shroud 157 with the inner shroud 158.

In this way, the canister 45 is disposed in front of the fuel tank 131, and in the space 160. This can suppress entry of dust or water into the canister 45, and also can prevent the canister 45 from being swamped. With a simple structure, this can maintain performance of the canister 45 for a long time.

Further, as shown in FIG. 12 and FIG. 13, the canister 45 is supported with the shroud 152 as a tank cover. The shroud 152 is supported with the vehicle body frame 111 and the fuel tank 131. This structure allows the vehicle body frame 111 to support the shroud 152 more firmly, and also improves durability of the shroud 152 which supports the canister 45.

The above embodiments merely show one mode of the present invention, and therefore can be arbitrarily deformed or applied within a range not beyond the main object of the present invention.

For example, according to the above embodiments, the canister 45 shown in FIG. 1 and FIG. 12 may be provided in a position symmetrically opposite with respect to the vehicle body center line extending in the vehicle front-rear direction.

Further, the canister 45 is provided in positions in which the canister 45 overlaps with the fuel tanks 31, 101, 131 in height. Not limited to this, according to the first embodiment, the canister 45 may be provided in a position higher than the upper end of the front wheel 13 or the upper end of the rear wheel 16 whichever is lower, meanwhile, according to the second embodiment, the canister 45 may be provided in a position higher than the upper end of the front wheel 113 or the rear wheel 116 whichever is lower.

Further, not limited to being applied to the motorcycle 10, the present invention is also applicable to any saddle riding vehicle other than the motorcycle 10. Herein, the saddle riding vehicle includes any vehicle on which a rider rides astride. Thus, the saddle riding vehicle is any vehicle including, not only a motorcycle (including a motorized bicycle), any three-wheel vehicle or any four-wheel vehicle each categorized as an ATV (All Terrain Vehicle).

REFERENCE SIGNS LIST 10, 110 . . . Motorcycle (saddle riding vehicle)
11, 111 . . . Vehicle body frame
13, 113 . . . Front wheel
21, 121 . . . Head pipe
31, 101, 131 . . . Fuel tank
31a, 104 . . . Flange
35, 135 . . . Engine
45 . . . Canister
52 . . . Tank cover
62 . . . Charge pipe
64 . . . Drain pipe
65, 101 . . . Outer plate
66 . . . Bottom plate
67 . . . Fuel supply opening
75, 157 . . . Outer cover (cover body)
76, 158 . . . Inner cover
85 . . . Stay
87e . . . Fresh air introducing port
90, 160 . . . Space
99 . . . Supplied-fuel drain pipe
152 . . . Shroud (tank cover)
157 . . . Outer shroud (cover body)
158 . . . Inner shroud (inner cover)

The invention claimed is:

1. In a saddle riding vehicle having a vehicle body frame including a head pipe, a main frame extending rearwardly and downwardly from the head pipe, a down pipe extending rearwardly and downwardly from the head pipe below the main frame, an engine installed on the vehicle body frame in a rear side of a front wheel, a vehicle body mounted on the vehicle body frame, and a fuel tank supported on the vehicle body frame above the engine;

the improvement comprising a canister disposing structure comprising:

a tank cover for covering the fuel tank from a lateral side, the tank cover extending frontward of at least the fuel tank; and a canister covered with the tank cover from a lateral side in a position where the canister overlaps with the fuel tank in height, as seen in a side view, wherein:
the canister is disposed between the main frame and the down frame as seen in a side view,
the canister includes a fresh air introducing port for introducing a fresh air into the canister, the fresh air introducing port being opened in a space formed by at least the tank cover, and
the canister is connected to a drain pipe for draining a liquid in the canister to the outside of the canister, the drain pipe extending rearward at a height same as or higher than a lower end of the tank cover, the drain pipe merging with a supplied-fuel drain pipe and extending to a lower portion of the vehicle, the supplied-fuel drain pipe draining a fuel around a fuel supply port of the fuel tank.

2. The canister disposing structure of the saddle riding vehicle according to claim 1, wherein the canister is connected to a charge pipe for leading an evaporative fuel generated in the fuel tank to the canister, and wherein the charge pipe extends in the fuel tank in a position where an outer plate of the fuel tank is covered with the tank cover from a lateral side.

3. The canister disposing structure of the saddle riding vehicle according to claim 1, wherein the tank cover includes:
a cover body forming a side face of the vehicle body; and
an inner cover for covering an inside of the cover body in a vehicle width direction,
wherein at least a connecting portion for connecting the cover body with the inner cover is made into a dust-proof structure.

4. The canister disposing structure of the saddle riding vehicle according to claim 1, wherein the canister is positioned in the tank cover, and wherein a weight of the canister is supported with the fuel tank.

5. The canister disposing structure of the saddle riding vehicle according to claim 1, wherein:
a main body of the canister is in a cylindrical form, in side view,
an inclination angle of the canister, relative to a vertical line, is set between the following angles: an inclination angle of the head pipe of the vehicle body frame relative to the vertical line; and an inclination angle 0° relative to the vertical line,
and wherein a lower end of the canister is operatively supported by the fuel tank.

6. The canister disposing structure of the saddle riding vehicle according to claim 4, wherein a stay is fixed to an outer plate of the fuel tank, and the weight of the canister is supported with the stay.

7. The canister disposing structure of the saddle riding vehicle according to claim 4, wherein:
the fuel tank includes a bottom plate fixed to the outer plate,
a peripheral edge of the outer plate and a peripheral edge of the bottom plate are fixed to form a flange,
the flange extends toward a bottom face of the canister, and the flange supports the weight of the canister.

8. The canister disposing structure of the saddle riding vehicle according to claim 1, wherein the canister is operatively supported by the tank cover, and the tank cover is supported by the vehicle body frame.

9. The canister disposing structure of the saddle riding vehicle according to claim 2, wherein the tank cover includes:
a cover body forming a side face of the vehicle body; and
an inner cover for covering an inside of the cover body in a vehicle width direction,
and wherein at least a connecting portion for connecting the cover body with the inner cover is made into a dust-proof structure.

10. The canister disposing structure of the saddle riding vehicle according to claim 2, wherein the canister is positioned in the tank cover, and a weight of the canister is supported with the fuel tank.

11. The canister disposing structure of the saddle riding vehicle according to claim 3, wherein the canister is positioned in the tank cover, and a weight of the canister is supported with the fuel tank.

12. The canister disposing structure of the saddle riding vehicle according to claim 2, wherein:
a main body of the canister is in a cylindrical form, in side view,
an inclination angle of the canister, relative to a vertical line, is set between the following angles: an inclination angle of the head pipe of the vehicle body frame relative to the vertical line; and an inclination angle 0° relative to the vertical line,
and wherein a lower end of the canister is operatively supported by the fuel tank.

13. The canister disposing structure of the saddle riding vehicle according to claim 3, wherein a main body of the canister is in a cylindrical form, in side view, an inclination angle of the canister relative to a vertical line is set between the following angles: an inclination angle of the head pipe of the vehicle body frame relative to the vertical line; and an inclination angle 0° relative to the vertical line, and a lower end of the canister is operatively supported by the fuel tank.

14. The canister disposing structure of the saddle riding vehicle according to claim 4, wherein a main body of the canister is in a cylindrical form, in side view, an inclination angle of the canister relative to a vertical line is set between the following angles: an inclination angle of the head pipe of the vehicle body frame relative to the vertical line; and an inclination angle 0° relative to the vertical line, and a lower end of the canister is operatively supported by the fuel tank.

15. The canister disposing structure of the saddle riding vehicle according to claim 5, wherein a stay is fixed to an outer plate of the fuel tank, and the weight of the canister is supported with the stay.

16. The canister disposing structure of the saddle riding vehicle according to claim 5, wherein the fuel tank includes a bottom plate fixed to the outer plate, a peripheral edge of the outer plate and a peripheral edge of the bottom plate are fixed to form a flange, the flange extends toward a bottom face of the canister, and the flange supports the weight of the canister.

17. The canister disposing structure of the saddle riding vehicle according to claim 2, wherein the canister is operatively supported by the tank cover, and the tank cover is operatively supported by the vehicle body frame.

18. The canister disposing structure of the saddle riding vehicle according to claim 3, wherein the canister is operatively supported by the tank cover, and the tank cover is operatively supported by the vehicle body frame.

19. The canister disposing structure of the saddle riding vehicle according to claim 1, wherein the canister is disposed so as to overlap with the tank cover in front view.

20. The canister disposing structure of the saddle riding vehicle according to claim 1, wherein a side wall of the fuel tank is tapered toward the head pipe, and the canister is disposed in a tapered portion of the side wall.

21. The canister disposing structure of the saddle riding vehicle according to claim 19, wherein a side wall of the fuel tank is tapered toward the head pipe, and the canister is disposed in a tapered portion of the side wall.

22. The canister disposing structure of the saddle riding vehicle according to claim 1, wherein the fuel tank and the tank cover both support the canister.

23. The canister disposing structure of the saddle riding vehicle according to claim 1, wherein a longitudinal axis of the canister is disposed at an acute angle in relation to a vertical line.

* * * * *